(12) United States Patent
Lee et al.

(10) Patent No.: US 9,317,708 B2
(45) Date of Patent: Apr. 19, 2016

(54) HARDWARE TRUST ANCHORS IN SP-ENABLED PROCESSORS

(75) Inventors: Ruby B. Lee, Princeton, NJ (US); Jeffrey S. Dwoskin, Shrewsbury, NJ (US)

(73) Assignee: Teleputers, LLC, Princeton, NJ (US)

( * ) Notice: Subject to any disclaimer, the term of this patent is extended or adjusted under 35 U.S.C. 154(b) by 1096 days.

(21) Appl. No.: 12/541,823

(22) Filed: Aug. 14, 2009

(65) Prior Publication Data

US 2010/0042824 A1 Feb. 18, 2010

Related U.S. Application Data

(60) Provisional application No. 61/188,930, filed on Aug. 14, 2008.

(51) Int. Cl.
*H04L 9/00* (2006.01)
*G06F 21/62* (2013.01)
*H04L 9/08* (2006.01)

(52) U.S. Cl.
CPC ............ *G06F 21/6218* (2013.01); *H04L 9/083* (2013.01); *H04L 9/0844* (2013.01);
(Continued)

(58) Field of Classification Search
None
See application file for complete search history.

(56) References Cited

U.S. PATENT DOCUMENTS 7,516,491 B1 * 4/2009 Schlafly ........................ 726/26
2004/0076292 A1 * 4/2004 Sato ............................... 380/30

(Continued)

OTHER PUBLICATIONS

Ashenden, P. J., Ashenden, DLX processor. http://ghdl.free.fr/dlx/cache.9.html.

(Continued)

*Primary Examiner* — Joseph P. Hirl
*Assistant Examiner* — Leynna Truvan
(74) *Attorney, Agent, or Firm* — McCarter & English, LLP

(57) ABSTRACT

A trust system and method is disclosed for use in computing devices, particularly portable devices, in which a central Authority shares secrets and sensitive data with users of the respective devices. The central Authority maintains control over how and when shared secrets and data are used. In one embodiment, the secrets and data are protected by hardware-rooted encryption and cryptographic hashing, and can be stored securely in untrusted storage. The problem of transient trust and revocation of data is reduced to that of secure key management and keeping a runtime check of the integrity of the secure storage areas containing these keys (and other secrets). These hardware-protected keys and other secrets can further protect the confidentiality and/or integrity of any amount of other information of arbitrary size (e.g., files, programs, data) by the use of strong encryption and/or keyed-hashing, respectively. In addition to secrets the Authority owns, the system provides access to third party secrets from the computing devices. In one embodiment, the hardware-rooted encryption and hashing each use a single hardware register fabricated as part of the computing device's processor or System-on-Chip (SoC) and protected from external probing. The secret data is protected while in the device even during operating system malfunctions and becomes non-accessible from storage according to various rules, one of the rules being the passage of a certain time period. The use of the keys (or other secrets) can be bound to security policies that cannot be separated from the keys (or other secrets). The Authority is also able to establish remote trust and secure communications to the devices after deployment in the field using a special tamper-resistant hardware register in the device, to enable, disable or update the keys or secrets stored securely by the device.

40 Claims, 10 Drawing Sheets

(52) U.S. Cl.
CPC ...... *H04L9/0894* (2013.01); *G06F 2221/2107* (2013.01); *G06F 2221/2115* (2013.01); *H04L 2209/12* (2013.01); *H04L 2209/60* (2013.01); *H04L 2209/805* (2013.01)

(56) References Cited

U.S. PATENT DOCUMENTS

| | | | |
|---|---|---|---|
| 2007/0172053 | A1 | 7/2007 | Poirier |
| 2008/0005586 | A1* | 1/2008 | Munguia ........................ 713/189 |
| 2008/0137848 | A1* | 6/2008 | Kocher et al. .................. 380/201 |
| 2008/0159541 | A1 | 7/2008 | Kumar et al. |
| 2008/0165971 | A1 | 7/2008 | de Cesare et al. |
| 2009/0007104 | A1* | 1/2009 | Zimmer et al. ..................... 718/1 |
| 2009/0172328 | A1* | 7/2009 | Sahita et al. ................... 711/163 |
| 2009/0319761 | A1* | 12/2009 | Bostanci et al. .............. 712/226 |
| 2011/0161648 | A1* | 6/2011 | Ekberg et al. ...................... 713/2 |

OTHER PUBLICATIONS

Best, R. M. "Preventing Software Piracy with Crypto-Microprocessors," Proc. of IEEE Spring COMPCON S80, pp. 466-469, 1980.
Camtepe, S., "Combinatorial design of key distribution mechanisms for wireless sensor networks," European Symposium On Research in Computer Security (ESORICS'04), 2004.
Camtepe, S. A. "Key distribution mechanisms for wireless sensor networks: a survey," Rensselaer Polytechnic Institute, Computer Science Department, Tech. Rep. TR-05-07, Mar. 2005, available at http://www.cs.rpi.edu/research/pdf/05-07.pdf.
Chan, H., "Random key predistribution schemes for sensor networks," in IEEE Symposium on Security and Privacy, 2003.
Du, W. "A Key Management scheme for wireless sensor networks using deployment knowledge," in *INFOCOM'04*. Hong Kong, Mar. 2004.
Du, W "A pairwise key predistribution scheme for wireless sensor networks," in CCS'03: ACM Conference on Computer and Communications Security, New York, NY, 2003, pp. 42-51.
Dwoskin, J., "Hardware-rooted Trust for Secure Key ManagemenT and Transient Trust", ACM Conference on Computer and Communications Security (CCS) 2007, pp. 389-400, Oct. 2007.
Dwoskin, J., "Secure Key Management Architecture Against Sensor-node Fabrication Attacks", IEE GlobeCom 2007, Washington, DC, Nov. 2007.
Dwoskin, J. "SP Processor Architecture Reference Manual," *Technical Report CE-L2007-008*, Nov. 21, 2007.
Zhu, S. "Establishing pairwise keys for secure communication in ad hoc networks: A probabilistic approach," in ICNP'03, 2003.
IETF Network Working Group. "Pre-Shared Key Ciphersuites for Transport Layer Security (TLS),". Request for Comments: 4279. http://www.ietf.org/rfc/rfc4279.txt.
Intel, "LaGrande Technology Architectural Overview," http://www.intel.com/technology/security/ Sep. 2003.
"ITU-T Recommendation X.509, The Directory: Authentication Framework", Int'l Telecomm. Union, Geneva, 2000; ISO/IEC 9594-8.
National Institute of Standards and Technology, "Advanced Encryption Standard," *Federal Information Processing Standards Publication*, FIPS Pub 197, Nov. 2001.
National Institute of Standards and Technology. "The Keyed-Hash Message Authentication Code (HMAC)," Federal Information Processing Standards Publication, FIPS Pub 198. http://csrc.nist.gov/publications/fips/fipsl98/fips198a.pdf.
PAX processor project, <http://palms.ee.princeton.edu/pax>.
"SecureCore for Trustworthy Commodity Computing and Communications," Collaborative project by Princeton University, Naval Postgraduate School and University of Southern California. Project home-page at http://palms.ee.princeton.edu/securecore/.
Trusted Computing Group. "Trusted Platform Module (TPM) Main Part 1 Design Principles" Specification Version 1.2, Level 2 Revision 103, Jul. 9, 2007 published.
SecureCore project, <http://securecore.princeton.edu/>.

Eschenauer, L., "A key-management scheme for distributed sensor networks," in CCS'02: ACM conference on Computer and communications security, New York, NY, 2002, pp. 41-47.
Fiskiran, M. "On-chip lookup tables for fast symmetric-key encryption," in ASAP '05: Proceedings of the 2005 IEEE International Conference on Application-Specific Systems, Architecture Processors, 2005, pp. 356-363.
Fiskiran, M., "PAX: A Datapath-Scalable Minimalist Cryptographic Processor for Mobile Environments," *Embedded Cryptographic Hardware: Design and Security*, Nadia Nedjah and Luiza de Macedo Mourelle, eds., Nova Science, NY, ISBN 1-59454-145-0, Sep. 2004.
Howard, A., Mobile sensor network deployment using potential fields: A distributed, scalable solution to the area coverage problem, in Distributed Autonomous Robotic Systems, 2002.
Hwang, J. "Revisiting random key pre-distribution schemes for wireless sensor networks," *ACM workshop on Security of ad hoc and sensor networks*, pp. 43-52, 2004.
Gilmont, T. "An Architecture of Security Management Unit for Safe Hosting of Multiple Agents," Proc. of the Int'l Workshop on Intelligent Communications and Multimedia Terminals, pp. 79-82, Nov. 1998.
Kirovski, D. "Enabling Trusted Software Integrity," Proc. of the 10th Int'l Conf. on Architectural Support for Programming Languages and Operating Systems (ASPLOS-X), Oct. 2002.
Lee, J. "Deterministic key predistribution schemes for distributed sensor networks," Selected Areas in Cryptography, 2004.
Lee, R. B.; "Architecture for Protecting Critical Secrets in Microprocessors," Proceedings of the 32nd International Symposium on Computer Architecture (ISCA 2005), pp. 2-13, Jun. 2005.
Lee, R.B., "PAX: A Cryptographic Processor with Parallel Table Lookup and Wordsize Scalability," Princeton University Department of Electrical Engineering Technical Report CE-L2007-01 0, Nov. 2007.
Lie, D. "Architectural Support for Copy and Tamper Resistant Software," Proc. of the 9th Int'l Conf. on Architectural Support for Programming Languages and Operating Systems (ASPLOS-IX)., pp. 168-177, 2000.
Liu, D. "Location-based pairwise key establishment for static sensor networks," in 1st ACM Workshop on Security of Ad Hoc and Sensor Networks, 2003.
Merkle, R. C. "Protocols for public key cryptography," IEEE Symposium on Security and Privacy, pp. 122U134, 1980.
Parno, B. "Distributed Detection of Node Replication Attacks in Sensor Networks," in IEEE Symposium on Security and Privacy, 2005.
Pietro, R. D., "Random key-assignment for secure wireless sensor networks," in SASN'03: ACM workshop on Security of ad hoc and sensor networks, New York, NY, 2003, pp. 62-71.
Seys, S. "The wandering nodes: Key management for lower-power mobile ad hoc networks," in IEEE International Conference on Distributed Computing Systems Workshops. ICDCSW'05, 2005.
Suh, G. E. "AEGIS: Architecture for Tamper-Evident and Tamper-Resistant Processing," Proc. of the 17th Int'l Conf. on Supercomputing (ICS), 2003.
Xu, D. "Re-examining probabilistic versus deterministic key management," in ISIT'07. Nice. France, 2007.
Zhu, S. "LEAP: efficient security mechanisms for large-scale distributed sensor networks," in CCS'03: ACM conference on Computer and communications security, New York, NY, 2003, pp. 62-72.
Zhu, S. "An interleaved hop-by-hop authentication scheme for filtering of injected false data in sensor networks," Security and Privacy, 2004. Proceedings. 2004 IEEE Symposium on, pp. 259-271, 2004.
Bhaskara, G., "Virtualization and Integration of SP Services in SecureCore", University of California, Information Sciences Institute Technical Report ISI-TR-623, Sep. 2006.
International Search Report and the Written Opinion issued for the International PCT Application No. PCT/US2009/053938, issued on Sep. 21, 2009, 12 pages.
Ashenden, P.J., Ashenden, DLX Processor, Copyright 1993 http://ghdl.free.fr/dlx/cahce.9.html (2 pages).

(56) References Cited

OTHER PUBLICATIONS

National Institute of Standards and Technology, "The Keyed-Hash Message Authentication Code (HMAC)," Federal Information Processing Standards Publication, FIPS Pub 198, Mar. 6, 2002 http://csrc.nist.gov/publications/fips/fips198/fips-198a.pdf (20 pages).

PAX Project http://web.archive.org/web/20040719080018/http://palms.ee.princeton.edu/pax, Internet Archive Posting dated Jul. 19, 2004 (2 pages).

Palms—Princeton Univeristy, http://web.archive.org/web/20080224082422/http://palms.ee.princeton.edu/pax, Internet Archive Posting dated Feb. 24, 2008 (5 pages).

Lee, et al., "Collaborative Research: SecureCore for Trustworthy Commodity Computing and Communications," https://web.archive.org/web/20070621122028/http://palms.ee.princeton.edu/securecore, Internet Archive Posting dated Jun. 21, 2007 (2 pages).

Lee, et al., "SecureCore Trustworthy Commodity Computation and Communication" Poster from NSF Cyber Trust Annual Principal Investigator Meeting, Jan. 28-30, 2007 (1 page).

Lee, et al., "SecureCore Trustworthy Commodity Computation and Communication" Poster from NSF Cyber Trust Annual Principal Investigator Meeting, Sep. 25-27, 2005 (1 page).

Lee, et al., "SecureCore Project, Collaborative Research: SecureCore for Trustworthy Commodity Computing and Communications," https://web.archive.org/web/20071111174944/http://securecore.princeton.edu, Internet Archive Posting dated Nov. 11, 2007 (1 page).

Lee, et al., "SecureCore for Trustworthy Commodity Computing and Communications: Year 2 Accomplishments," dated Mar. 26, 2007 (19 pages).

* cited by examiner

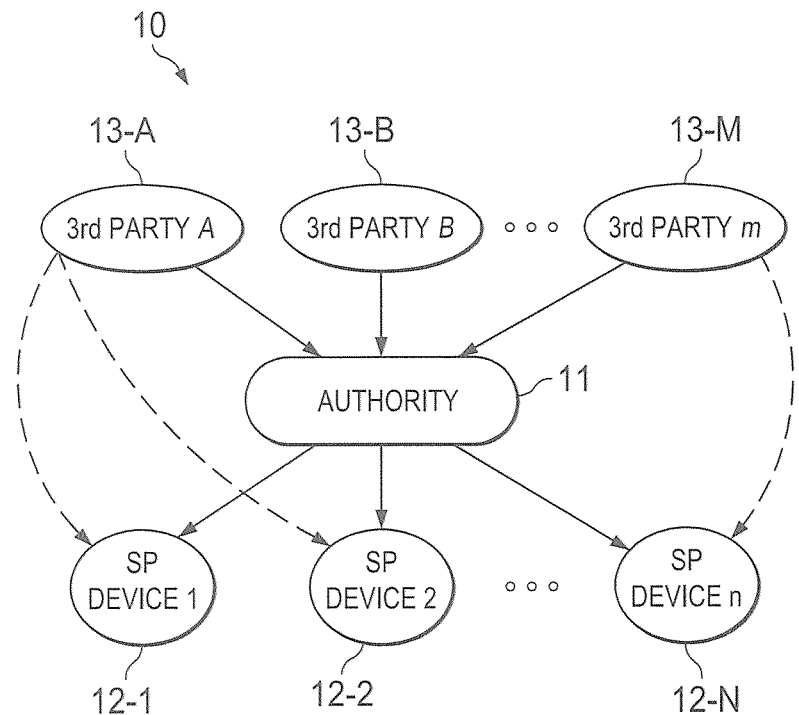

FIG. 1

| Instruction | Description |
|---|---|
| New Authority Mode SP Instructions ||
| GR_TO_DRK | Sets Device Root Key register from GRs. |
| DRK_LOCK | Sets DRK_Lock register to 1, disabling GR_TO_DRK instruction. |
| GR_TO_SRH | Sets Storage Root Hash register from GRs. |
| SRH_TO_GR | Reads the Storage Root Hash register into GRs. |
| DRK_DERIVE | Derives a key from DRK by computing a keyed hash over a nonce and constants. |
| Instructions for providing a Concealed Execution Mode for TSM code ||
| BEGIN_CEM | Enter CEM for next instruction. |
| END_CEM | End CEM for next instruction. |
| SECURE_STORE | Secure store from GR to memory. |
| SECURE_LOAD | Secure load to GR from memory. |

FIG. 3

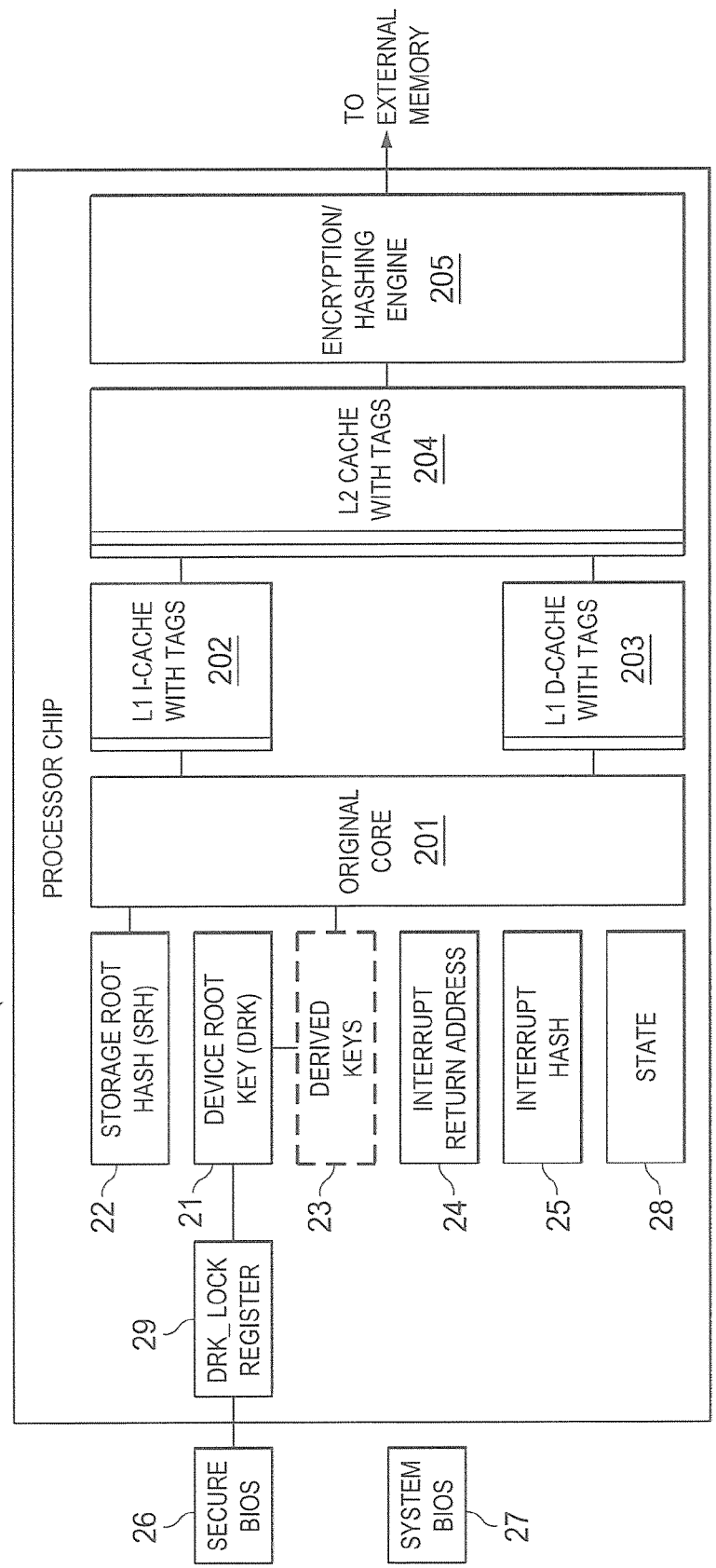

| ID | Type | Nonce | MAC | Size | Location |
|-----|------|--------|----------|-------|------------------|
| 001 | 1 | 813547 | 0110...1101 | 6144 | nodes/item1.dat |
| 002 | 1 | 718232 | 0001...0101 | 9216 | nodes/dn2.dat |
| 003 | 1 | 128203 | 0100...1100 | 6144 | nodes/item3.dat |
| 004 | 2 | 519025 | 1010...0011 | 27648 | nodes/policy4.dat |
| 005 | 3 | 251092 | 0101...0001 | 13824 | nodes/meta5.dat |

Storage key for encryption of node $i$:
$$K_{Si\,Enc} = MAC_{DRK}\,[\,C_{Storage},\,C_{Enc},\,N_{Si}\,]$$

Storage key for hash of node $i$:
$$K_{Si\,MAC} = MAC_{DRK}\,[\,C_{Storage},\,C_{MAC},\,N_{Si}\,]$$

Communication key for Authority to Device:
$$K_{A \rightarrow D} = MAC_{DRK}\,[\,C_{Comm},\,C_A,\,N_A,\,N_D\,]$$

Communication key for Device to Authority:
$$K_{D \rightarrow A} = MAC_{DRK}\,[\,C_{Comm},\,C_D,\,N_D,\,N_A\,]$$

FIG. 7

A (Authority), D (Device)

Initiate communications, generate nonces and send challenges:
801 — D → A: $ID_D$; send device's ID to initiate communications
802 — A → D: $N_A$; random 128 bit nonce
803 — D → A: $N_D$; random 128 bit nonce Generate derived keys for communication:
804 — ; A,D: $K_{AD} = MAC_{DRK}\,[C_{Comm},\,C_A,\,N_A,\,N_D]$
805 — ; D,A: $K_{DA} = MAC_{DRK}\,[C_{Comm},\,C_D,\,N_D,\,N_A]$ Send Responses:
806 — A → D: $Response_A = MAC_{KAD}[N_A,\,N_D]$
807 — D → A: $Response_D = MAC_{KDA}[N_D,\,N_A]$ Verify responses:
808 — ; A: $MAC_{KDA}[N_D,\,N_A] =?\,Response_D$
809 — ; D: $MAC_{KAD}[N_A,\,N_D] =?\,Response_A$

FIG. 8A

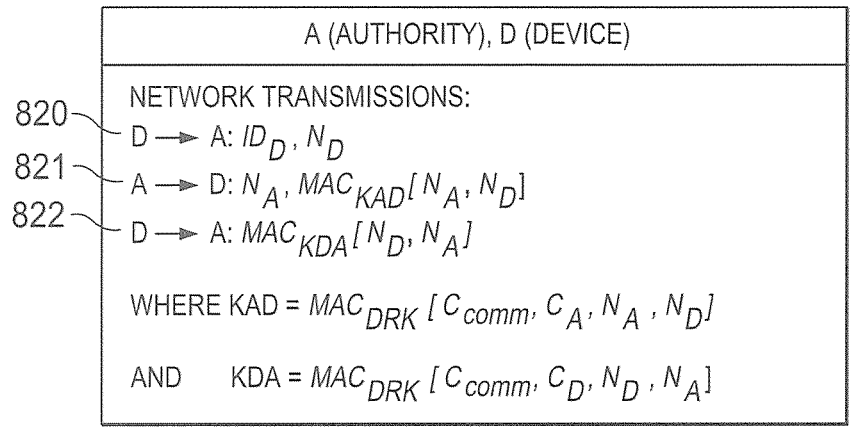

FIG. 8B

| Instruction | Description |
| --- | --- |
| Begin_TSM | Begins execution of the TSM |
| End_TSM | Ends execution of the TSM |
| Secure_Store | Secure store from processor to TSM scratchpad memory. (TSM only) |
| Secure_Load | Secure load from TSM scratchpad memory to processor. (TSM only) |
| DeviceKey_Read | Read the Device Key. (TSM only) |
| DeviceKey_Set | Sets the Device Key register. First clears the TSM scratchpad memory. |
| ASH_Set | Sets the ASH register. First clears the Device Key and TSM scratchpad memory. |

FIG. 10

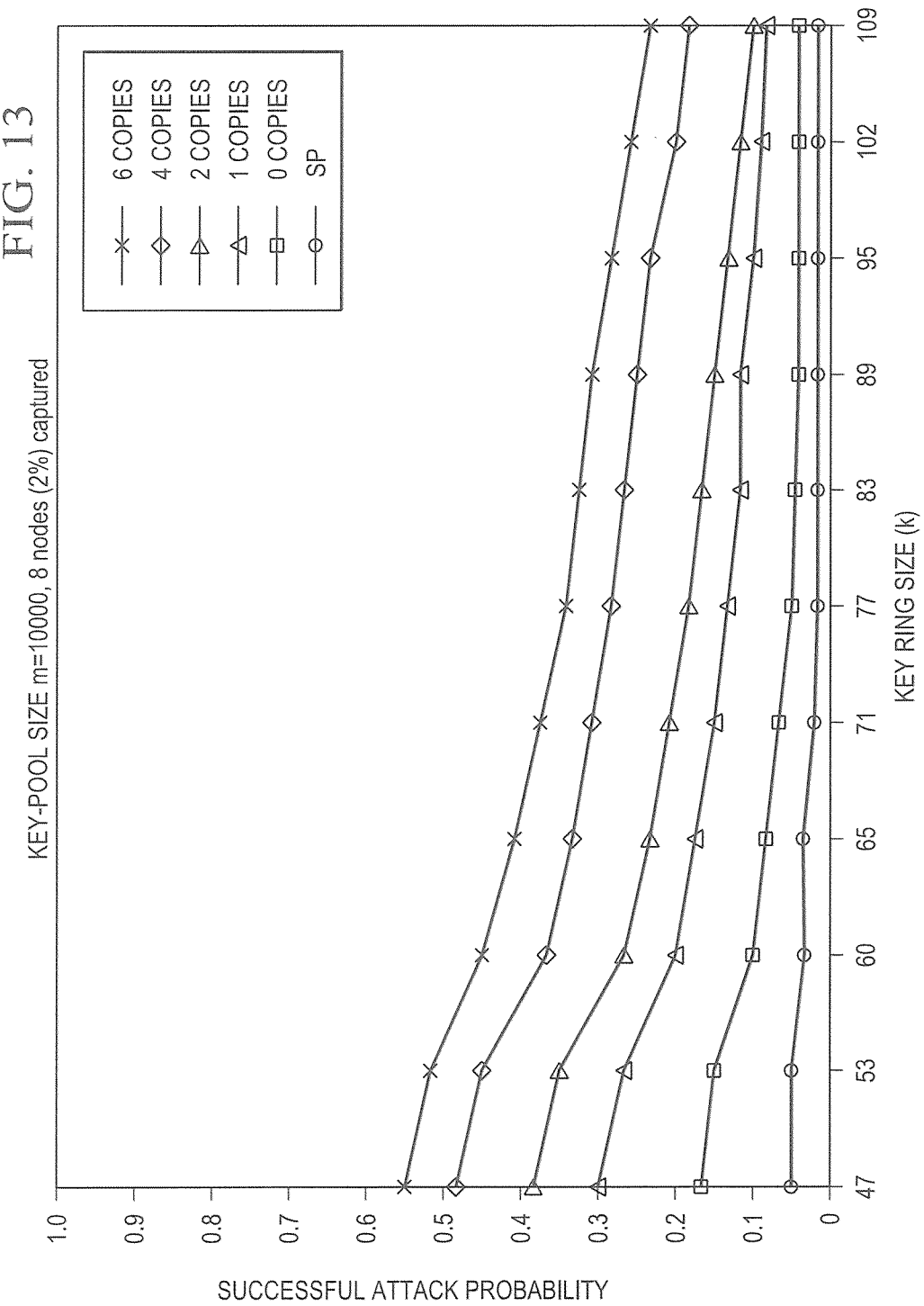

HARDWARE TRUST ANCHORS IN SP-ENABLED PROCESSORS

CROSS-REFERENCE TO RELATED APPLICATIONS

This application claims priority to Provisional Patent Application Ser. No. 61/188,930 filed Aug. 14, 2008 entitled, "HARDWARE TRUST ANCHORS IN SP-ENABLE PROCESSORS," which application is hereby incorporated by reference herein.

GOVERNMENT LICENSE RIGHTS

This invention was made with Government support under contract number CNS-0430487 awarded by the National Science Foundation. The Government has certain rights in the invention.

TECHNICAL FIELD

This disclosure relates to the distribution of secure data and more specifically to systems and methods for managing secure data on portable devices and even more particularly to the use of hardware-rooted secure key management to achieve a high degree of security even in transient and emergent situations.

BACKGROUND OF THE INVENTION

Maintaining data securely is often an important consideration in data management systems. Not only must the data be secure from physical attacks at the site of the data storage but the data must be able to be communicated from one location to another without fear of unauthorized interception even when one of the locations is not itself secure. However, data stored on a computing device is subject to access by the operating system and even when protected from unauthorized operating system access or unauthorized access by application software, it is possible to compromise the operating system thereby gaining access to the secure data.

Often it is necessary to give certain people access to extremely sensitive information for limited periods of time with the understanding that the information will not become compromised, improperly disseminated, improperly retained, and/or improperly modified. When the people requiring such information access are using portable devices such as computers, PDAs and the like, the information provider must be comfortable that the portable devices are secure from tampering and that the communications to and from the portable devices is secure from compromise by an adversary. Even when the portable devices are ones that the data provider has supplied (or are otherwise familiar with) the security problem is difficult to manage. When the portable devices to which sensitive data is to be transferred are unknown to the provider then the problem of maintaining a high level of trust is difficult to achieve.

One scenario in which sensitive data must be distributed to various locations arises in emergent conditions (such as a fire in a large building, terrorism attack, medical emergency, etc.) where data critical to saving lives must be quickly disseminated to first responders and where that data is highly sensitive in nature. For example, it could be critical for the proper evacuation of a building for the first responders to have images of the physical structure of the building including office layouts, names of employees, and perhaps their medical conditions. Also, safes and other sensitive areas may have to be entered to protect life and/or property. This highly sensitive data ideally should be available on portable devices carried by the first responders and only available for the period of time necessary to handle the emergent condition. For purposes of discussion herein, the term transient trust is defined as the ability to access protected information for a limited time under certain conditions.

Under present security management systems, the data on those portable devices can be easily compromised during transmission, during usage, while in local storage, and after the emergent condition has ended and thus there is a low transient trust level when sensitive data is allowed to reside on portable devices.

Encryption of data has been used for many years to secure communications among different entities. Encryption requires keys to decode the secure communications and therein lies one of the problems with sending data to remote devices, namely, the remote device requires a key for decryption of the transmitted and or stored data.

If it could be assured that both ends of a communication link are secure (from network attacks, software attacks, as well as physical attacks, then secure storage of the keys is a concern that is manageable by the entity requiring security for its data. However, devices that are in non-secure physical environments (such as with first responders) or devices that operate in a non-secure operating environment (such as PCs) give rise to major concerns over the confidentiality and integrity of data transmitted to or from such devices as well as to the confidentiality and integrity of data stored in such devices.

Security is one of the critical requirements for the deployment of lightweight wireless ad hoc networks which consist of nodes, such as low-cost sensors or embedded devices. These networks are ideal for applications like environmental surveillance and emergency response. The nodes in such networks are typically highly distributed without a centralized controller, and each node has very limited computation and energy resources. It is thus a challenging task to maintain a high security level in such networks.

Key management is the cornerstone of secure communication when cryptographic techniques are used for security. For lightweight ad hoc networks that are typically deployed in hostile environments, adversaries can easily capture the nodes and try to extract the keys from them, leading to severe security threats to the network. Thus, a secure-architecture-based technique is needed to protect the keys in the captured nodes, thus key management schemes must be robust even in the face of node capture.

Key management is also the cornerstone of secure storage and the provision of a secure execution environment in processing secure data, assuming the use of strong cryptography to provide security properties like confidentiality and integrity.

Software can implement flexible security policies desired by the application, but this software must be strongly protected if it is to carry out these policies faithfully. If an adversary can modify security policies implemented by an application by modifying this software, then security is violated.

BRIEF SUMMARY OF THE INVENTION

A trust system and method is disclosed for use in computing devices, particularly portable devices, in which a central Authority shares secrets and sensitive data with users of the respective devices. The central Authority maintains control over how and when shared secrets and data are used. In one embodiment, the secrets and data are protected by hardware-rooted encryption and cryptographic hashing, and can be stored securely in untrusted storage. The problem of transient trust and revocation of data is reduced to that of secure key management and keeping a runtime check of the integrity of the secure storage areas containing these keys (and other secrets). These hardware-protected keys and other secrets can further protect the confidentiality and/or integrity of any amount of other information of arbitrary size (e.g., files, programs, data) by the use of strong encryption and/or keyed-hashing, respectively. In addition to secrets the Authority owns, the system provides access to third party secrets from the computing devices. In one embodiment, the hardware-rooted encryption and hashing each use a single hardware register fabricated as part of the computing device's processor or System-on-Chip (SoC) and protected from external probing. The secret data is protected while in the device even during operating system malfunctions and becomes non-accessible from storage according to various rules, one of the rules being the passage of a certain time period. The use of the keys (or other secrets) can be bound to security policies that cannot be separated from the keys (or other secrets). The Authority is also able to establish remote trust and secure communications to the devices after deployment in the field using a special tamper-resistant hardware register in the device, to enable, disable or update the keys or secrets stored securely by the device.

In one operation, a software program runs on the portable device in conjunction with a device root key (DRK) (a device-specific master cryptographic key) which is built into the microprocessor in one of the registers. Another register contains a storage root hash (SRH) which then serves to encode the integrity of a storage structure. Together, the DRK and the SRH provide a secure execution environment for the software program that operates on the critical secrets. In this manner, the processor itself provides hardware-rooted trust for flexible software architecture and usage models.

Note that the trusted software module protected directly by SP hardware can be used to implement an arbitrary number of desired security policies such that it can protect anything that it is set up to protect such as a security policy, or other data. There may be one or more data registers like the SRH, accessible only to the trusted software module, which can use it in different ways.

By using a root of trust embedded in the hardware microprocessor or System-on-a-Chip (SoC), it is possible to protect sensitive keys in a sensor-node platform or a node in a mobile ad-hoc network. This prevents an adversary from extracting these protected long-term keys from a captured node in order to fabricate new nodes. Note that the trusted software module protected directly by SP hardware can be used to implement an arbitrary number of desired security policies such that it can protect anything that it is set up to protect such as a security policy, or other data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows one embodiment of a system in which a trusted Authority is in secure communication with devices, and is in secure communication with third parties;

FIG. 2 shows one embodiment of a micro-processor used to enhance secure key management and enable transient trust in keeping with the concepts discussed herein;

FIG. 3 is a table showing new instructions for use with the embodiments discussed herein;

FIG. 7 shows an example of derived keys using the concepts discussed herein;

FIGS. 8A and 8B show one embodiment of a challenge-response protocol used to generate session keys and attestation;

FIG. 10 shows a set of instructions used for initialization in a Sensor-mode architecture with many of these instructions used only by a trusted software module;

FIG. 13 shows a network-wide successful attack probability graph using different key ring sizes employing the concepts discussed herein.

DETAILED DESCRIPTION OF THE INVENTION

Figure 4A:
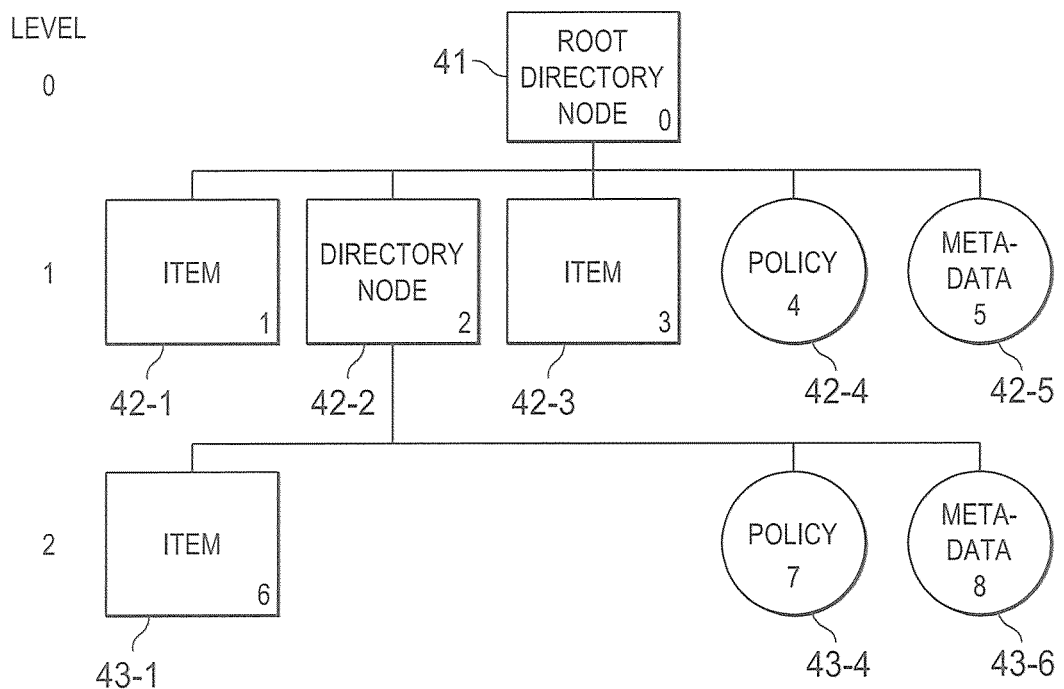
FIG. 4A shows one embodiment of the basic tree structure of the secure local storage.

FIG. 1 shows one embodiment of a system, such as system 10, in which trusted Authority 11 is in secure communication with devices 12-1 to 12-N. In a preferred embodiment, devices 12-1 to 12-N are portable devices but the concepts discussed herein can be used whether or not one or more of devices 12-1 to 12-N are portable or permanently located. Also shown in FIG. 1, are third parties, such as third parties 13-A to 13-M, who can communicate sensitive information to one or more of devices 12-1 to 12-N either through Authority 11 or directly with a high degree of trust that the information will remain secure and not be compromised or intercepted (and able to be interpreted or understood if intercepted) during transmission. Note that the concepts discussed herein will work whether or not any of parties 13-A to 13-M are present.

In the embodiment shown, Authority 11 owns or controls devices 12-1 through 12-N and, as will be discussed, establishes a trust relationship with each device. Once this trust relationship is established, the Authority can delegate trust to the device itself, depicted as arrows in FIG. 1. The Authority can distribute secrets (for example, encryption keys) to the devices for remote use. The Authority will specify access control for each data session by sending policies associated with the keys or by pre-installing keys into the device with access policies attached. The devices will enforce the policies with respect to the data on a session by session basis or over multiple sessions if desired. Several scenarios will now be discussed.

In one scenario called remote trust, Authority-owned secrets are provided to a remote device with assurance the secrets will be protected using the Authority's own trusted software (called the trusted software module or TSM) which it had earlier installed in the device. The trust relationship is based on a shared secret, binding together the Authority's secrets with its trusted software and allowing the device to remotely attest to the Authority that it is operating correctly.

In a second scenario, secrets are bound to a specific policy for accessing and/or destroying the secret. Remotely from the Authority, the device then performs enforcement of the policy with respect to the secrets and protects the secrets and the policy from illegitimate modification or separation from each other when stored on the device. This ensures that secrets are only used in authorized ways and only through controlled interfaces.

A third scenario is one of transient trust which allows the Authority to provide secrets to remote users on a temporary basis, with reliable revocation mechanisms. The Authority could set limits on use, change policies, or remove secrets entirely. Such policy enforcement and changes are guaranteed to occur using the concepts discussed herein.

A fourth scenario called controlled transitive trust is discussed in which trust is expanded to include secrets and sensitive information from third parties, such as parties 13-A to 13-M in FIG. 1. In this scenario, the Authority and each third party first agree on security policies to be used by the Authority's devices to access third-party confidential data. The Authority installs these policies in the devices, (either at the time of initialization of the device or over a secure communication connection thereafter) which can be trusted to enforce them. The Authority thus enables transitive trust from the third parties to individual devices by establishing policy-controlled temporary relationships between theme, depicted as arrows with dashed lines in FIG. 1. During operation, the devices can communicate directly with the third parties and access secrets and data for which they will also enforce the associated policies.

Assumptions and Threat Model

The threat model used herein covers operational threats as opposed to developmental threats. Hence, the assumption is made that the devices are manufactured correctly in a trusted environment and that the hardware is free from defects. The Authority will receive the devices from the manufacturer with all processor and system features intact and unmodified. Similarly, while there is no assumption that the regular system software is correct, it is assumed that the Authority's trusted software is carefully designed and well-tested to ensure that it is correct and has no software security vulnerabilities. Furthermore, strong cryptography for encryption and hashing is assumed which should be computationally infeasible to break. Note that the actual cryptology, including encryption and hashing, are well-known and not detailed herein. One example of such cryptology is the use of AES and HMAC as discussed in National Institute of Standards and Technology, "Advanced Encryption Standard," Federal Information Processing Standards Publication, FIPS Pub 197, November 2001, and National Institute of Standards and Technology, "The Keyed-Hash Message Authentication Code (HMAC)," Federal Information Processing Standards Publication, FIPS Pub 198, which are all hereby incorporated by reference herein.

In the concepts discussed herein the processor chip, as will be discussed, is the physical security boundary for the hardware. If an adversary has physical possession of the device, he/she can probe buses on the board but typically cannot probe inside the processor chip without rendering it unusable. A microprocessor chip is fabricated with many physical layers and processing steps and because of its complexity, probing of this chip is extremely likely to destroy circuitry unless very expensive equipment is used. Hence, on-chip registers or cache memory are assumed to be safe from physical threats of observation or modification. Note that the concepts discussed herein will work as long as the hardware registers and other trusted hardware components are inside any similar physical security boundary, e.g., a System-on-a-Chip (SoC) or smart card. The use of the processor chip as this boundary is our preferred embodiment.

It is important to note that the trusted Authority must have secure systems where it can store its secrets and run its own software with perfect secrecy and access control. Likewise, it is important for the Authority to have a secure location at which it can initialize new devices. Also, note that while system 10 protects the confidentiality and integrity of the secrets, policies, and sensitive data, it is not designed to defend against Denial of Service attacks. Also note that device users are trusted to protect their authentication tokens (e.g., passwords) when logging in to a device and they are expected to log out promptly when a session is complete. The system will not protect against an adversary who can log onto a device and can successfully authenticate to the trusted software module.

In a paper entitled "Architecture for Protecting Critical Secrets in Microprocessors," by R. Lee, P. Kwan, J. P. McGregor, J. Dwoskin, Z. Wang; *Proceedings of the 32$^{nd}$ International Symposium on Computer Architecture (ISCA* 2005), pp. 2-13, published June 2005, (the "APCSM Article") which is hereby incorporated by reference herein, protection against threats to a user-owned device are discussed.

The threats for Authority-mode remote trust models are quite different than those for a local trust model of the type discussed in the above-identified article where the user is also the owner of the device and has physical possession of the device. In Authority controlled devices, the secrets are Authority-owned, (or third party owned) so while the local users are intentionally given access to those secrets, the users can also potentially be adversaries. Even legitimate users must not be allowed to exceed their authorization and access to secrets, or to use secrets in unauthorized ways.

The main threats considered herein are violations of the confidentiality and integrity of keys or other secrets that the Authority supplies to the user of the Authority-mode device. Attackers can launch software attacks on code and data, and network attacks by observing or modifying traffic on the public networks. Code and data on disk and in memory, in transit across the network or buses, as well as the processor state at interrupts, are all vulnerable to spoofing, splicing, and replay attacks. Spoofing introduces false data and modifications; splicing rearranges real data; and replay reintroduces previously used data that had been modified, deleted or revoked.

Physical threats can occur when an attacker has physical access to the device. In some situations, the device will be returned without evidence of tampering. Thus, an adversary can mount physical attacks on both the hardware and software. In a worst case attack, any code or data stored on the hard disk or in main memory, whether it belongs to the operating system or to an application, is fully accessible to the adversary. By modifying the operating system (a software attack), the adversary can access and manipulate the full state of an application, including the processor registers during interrupt handling. Main memory can also be accessed by physically probing the memory bus, or by performing rogue DMA operations. Using the concepts discussed herein the devices and their secrets are not susceptible to these types of compromises because the encryption key register is physically constructed within the hardware processor at a location such that probing of the register by a user is difficult to achieve without rendering the encryption key in the register useless for its intended purpose. Once the encryption key is rendered useless, either by physical corruption of the data or by corruption of the software that accesses the data, none of the encrypted information (the secure data) can be read. Certainly, it may be possible for a very sophisticated attacker to gain access to the encryption key register but to do so would require expensive equipment and knowledge of the processor not commonly known.

FIG. 2 shows one embodiment 20 of a micro-processor used to enhance secure key management and enable transient trust. Only two new processor registers containing hardware roots of trust are required to be added to existing microprocessor designs. These are device root key (DRK) 21 and storage root hash (SRH) 22. The operation of these registers will be discussed hereinafter. In addition, secure BIOS 26 is preferred for boot up to support this trust model. Note that the use of the secure BIOS prevents untrusted software from overwriting or clearing the Device Root Key (DRK) which would render the trust unusable—a type of Denial of Service attack. However, the trust model for confidentiality and integrity will still work.

In a preferred embodiment a 128-bit non-volatile register is used to store the device root key (DRK), and a 256-bit non-volatile register is used to store the Storage Root Hash (SRH). There is also a 1-bit DRK lock flag 29 which prevents software from writing to the DRK. The secure BIOS allows initialization of the DRK and to lock it before loading the regular BIOS or other software. Note that these bit-width sizes can be adjusted according to the security needs of the scenario.

These two registers may only be accessed by a Trusted Software Module (TSM), whose execution is protected by the hardware by a Concealed Execution Mode (CEM) which prevents leaking of intermediate values during TSM execution as described below.

The architecture is implemented in hardware with only four new registers (totaling 576 bits) plus 2 state bits and 1 lock bit (see FIG. 2). The four registers are the new 256-bit SRH register 22 and 128-bit DRK register 21 of authority-mode, and the 64-bit Interrupt Address 24 and 128-bit Interrupt Hash 25 registers to provide the Concealed Execution Mode operation as will be discussed. The 2 state bits and 1 lock bit can also be stored in two other registers. For on-chip caches, an insignificant 1-bit cache tag per L1 (Level 1) cache line 202 and 203 and 2-bit cache tag per L2 (Level 2) cache line 204 is added. An encryption/hashing engine 205 is added at the chip boundary. Nine new instructions are defined, (as shown in FIG. 3) and secure BIOS 26 is added. This represents a tiny and insignificant cost for any commodity microprocessor or SOC (System-on-Chip), and even for many embedded processors. Using the embodiment discussed herein the DRK can be a symmetric key which allows it to be much shorter than a public key. The device can communicate with a third party, other than the Authority, by using a public key if desired and based on a trusted certificate being passed from the device to the third party. The trusted certificate and corresponding private key are then protected by the DRK, the SRH and the TSM working in cooperation with each other as will be described. As discussed above, the bit-width sizes of the registers can be adjusted as desired.

The Trusted Software Module (TSM) is the only software able to directly access the DRK and SRH root secrets stored on the device. This high assurance, trusted software module is provided by the trusted Authority when the DRK and SRH are initialized in the device at a secure location under Authority supervision. The Authority thereupon trusts the loaded TSM to use the secrets correctly and to maintain confidentiality. Once the DRK and SRH are initialized and the TSM loaded, the device is ready for deployment into insecure locations, such as in a first responder vehicle.

The DRK is used to sign the TSM by inserting a keyed hash into each cache line of code, upon installation of the trusted code on the device. Later, the code is dynamically verified for integrity during TSM execution (Code Integrity Checking), which will be described in detail below.

Both the trusted software and the Authority's secrets will be bound to the DRK, and consequently to each other. Changing the TSM on the device, by anyone other than the Authority, requires replacing the DRK, since knowledge of the DRK is necessary to sign new code. This will simultaneously cut off all access to the secrets bound to the previous DRK. Therefore, the secrets and the TSM that operates on there are bound together and to the device itself.

To provide protection of the TSM, the secure execution environment discussed in the above-identified APCSM Article is leveraged. This can be summarized as two parts: Code Integrity Checking (CIC) and Concealed Execution Mode (CEM). While the hardware support provided for key management in the article does not meet the needs of an Authority-based system, the hardware support it provides for a secure execution environment for trusted software is appropriate. This is described briefly below.

The combination of dynamic Code Integrity Checking of the TSM with the protection of intermediate data in registers, caches and memory, provides a secure execution environment for executing trusted software that does not leak the values of the DRK and SRH registers, nor the keys they protect.

The first component, Code Integrity Checking, ensures that the TSM code cannot be modified during storage, transmission and execution. It also ensures that no other code can be used as a TSM with access to Authority secrets. TSM code is signed by computing a keyed cryptographic hash over each cache-line of code, keyed with the DRK, and embedding the hash into the code itself. For example, a 64-byte cache line would contain 48-bytes of TSM code, followed by a 16-byte hash (e.g., using AES-CBC-MAC as the hash algorithm). One example can be found in National Institute of Standards and Technology, "The Keyed-Hash Message Authentication Code (HMAC)," Federal Information Processing Standards Publication, FIPS Pub 198, hereby incorporated by reference herein. When the trusted Authority installs the TSM, it adds these hashes using the DRK. Without access to the DRK, no other party can sign TSM code.

During execution, the TSM code is verified as it is loaded into the on-chip Level-2 cache 204 in microprocessor chip 20. The keyed hash is recomputed over the cache line of instructions and compared to the stored value, causing any modifications to be detected dynamically during program execution and not just upon program launch as in other schemes. If the hash check passes, the embedded hashes are replaced with no-op instructions so as not to affect execution. Within the processor chip, the hardware keeps track of TSM code using cache-line tags added to the L2 (204) and L1 (202, 203) caches. Verified instruction cache-lines are tagged as "Secure Instructions" and are read-only. The tag is carried over from L2 cache to the L1 instruction-cache 202, and is checked when fetching TSM code for execution.

Note that L1 cache is used to represent the level of caches closest to the processor's pipeline and execution units, while L2 cache is used to denote the last level of on-chip cache in the processor chip (or multicore chip) before going off-chip. If there are three levels of cache on-chip, then all references to L2 are replaced with references to L3.

The second component is Concealed Execution Mode (CEM), which protects the confidentiality and integrity of data used by the TSM during execution. Intermediate data is stored in the general registers of the processor, in the caches and in main memory.

Intermediate data that could leak secret information is actively protected by the TSM by using special Secure-Load and Secure-Store instructions to read and write such data. In general within the security perimeter of the microprocessor chip, secure data is tagged in on-chip data cache lines with a "Secure Data" tag. When such a data cache line has to be evicted from the on-chip L2 cache, it is first encrypted and hashed with the DRK. Similarly, the contents of a data cache line are only hash-verified and decrypted when it has to be brought on-chip into the L2 cache. This happens on only a few Secure-Load and Secure-Store instructions which miss in both the L1 and L2 on-chip caches. Secure data in cache can only be read or written to by TSM code in CEM. Any accesses to "Secure Data" tagged cache lines with normal load and store instructions will cause them to be evicted (encrypted and hashed), and then reloaded in encrypted form.

Level 1 cache 202 is the instruction cache and Level 1 cache 203 is the data cache. Level 2 cache 204 is the last level of cache before going off-chip. Encryption hashing engine 205 ensures that whenever a line of data is evicted (leaves the processor) that it's protected by encryption. Likewise when a line of encrypted data enters the microprocessor it is decrypted.

Note that in this embodiment instructions are not encrypted when they leave the processor since instructions are read-only and are never written back to main memory. Only data cache lines need to be written back to memory, in which case the encryption and hashing engine first encrypts them and creates a keyed hash, and then later when bringing them back into cache, it verifies the hash and decrypts them. However, for proprietary or secret code that has to be protected for confidentiality—not just for integrity, TSM code can be encrypted with the DRK before it is signed by the Authority. In this alternative embodiment, the encryption and hashing engine will first verify the keyed hash of the code for CIC mode as TSM code is loaded into L2 cache. If the hash is correctly verified, it will then use the DRK to decrypt the code and place it in cache with the "Secure Instruction" tag. If such a "Secure Instruction" cache line must be evicted from cache, this plaintext copy will be deleted rather than written back to memory. When the line is needed again, it will be re-verified and decrypted from the original signed and encrypted copy on disk. Hence, with these two alternative embodiments. TSM code can be stored off-chip either always encrypted or always in plaintext.

Note also that even if an attacker could obtain the data from main memory, it would be in encrypted form and therefore would not be useful. The system is designed such that only the processor of this one machine, which has direct access to the DRK, can decode the secure data, and it will only provide that secure data to the TSM which has been correctly signed using the same DRK.

The contents of general registers must also be protected during a processor interrupt. The executing CEM thread can be interrupted at any time for a hardware interrupt or software exception. The interrupt handler of the Operating System (OS) then saves the process's register state to memory before executing other code. When an interrupt occurs during CEM, the hardware protects the registers before turning control over to the OS's interrupt handler. It encrypts the registers as a single plaintext chunk using the DRK, splits up the resulting ciphertext, and places it back in the registers. It computes a hash over the resulting ciphertext which is stored in the processor (in Interrupt Hash register 25) along with the memory address of the next CEM instruction (saved in Interrupt Address register 24). These are checked automatically to resume CEM when the interrupt is completed. With the contents of the general registers thus protected, the hardware then allows the OS interrupt handler to assume control to save and restore the register state without being able to read the (plaintext) contents.

The state of the processor, whether executing in CEM or not, and whether a thread in CEM has been suspended, is indicated by the State bits (register 28) in FIG. 2. More details on CEM and the hardware support for a secure execution environment can be found in the above-identified APCSM Article. Note that other mechanisms for providing a secure execution environment for the processor can also be used instead of the embodiment previously described, without violating the security provided by the hardware trust anchors, remote trust, transient trusts transitive trust and policy enforcement provided by this invention.

Secure Storage for Keys

Building off of the secure execution environment provided by CEM, the TSM in turn is responsible for protecting persistent secrets (e.g., the key-chain) from unauthorized access. For this protection, we create secure local storage, a data structure that provides hierarchically encrypted and hashed storage of keys.

This secure storage structure incorporates a Merkle hash-tree mechanism, R. C. Merkle, "Protocols for public key cryptography," *IEEE Symposium on Security and Privacy*, pp. 122U134, 1980, hereby incorporated by reference herein, with the root hash stored in the Storage Root Hash (SRH) register on-chip. The root hash, updated only by the TSM, ensures integrity of the keys or other secrets stored in the secure storage against malicious modifications by untrusted software. Since the root hash is stored on-chip, the secure storage is also protected against replay attacks—changes to the secure storage structure are made permanent, including deletions. Stale (deleted) data cannot be replayed since the root hash will no longer match.

In this preferred embodiment, the Storage Root Hash register 22 is used to store the root hash of a hash tree mechanism. However, more generally, as a master secret accessible only to the TSM and protected from physical attacks, this register can be used by the TSM as a small amount of secure storage for any software security mechanism. As another embodiment, the emergency state of the device (whether or not there is currently an emergency situation) could be stored directly in the SRH register; this use would place data rather than a hash in the SRH register on-chip. Using the SRH to store a root hash in our preferred embodiment permits the TSM to extend the trust of the on-chip storage to a larger quantity of data. The TSM can use the hardware trust anchors, including the SRH and DRK, to protect any data in addition to keys, and to protect and enforce any security policy whether or not that policy is tied to a key. While we described an embodiment with one data register (used as the SRH), in another embodiment, there can be more than one such data register accessible only to the TSM.

Replay-resistant secure storage provides transient trust for the Authority's keychain. At the Authority's request, the TSM can permanently revoke access to certain keys by deleting them from the secure storage. The secure storage also contains nodes for access control policies associated with keys, to be enforced by the TSM. This provides policy controlled secrets, which the Authority uses to cut off access when a predetermined condition is met. This provides another means of revocation that is effective even when the Authority cannot communicate with the remote device.

Figures 5, 6:
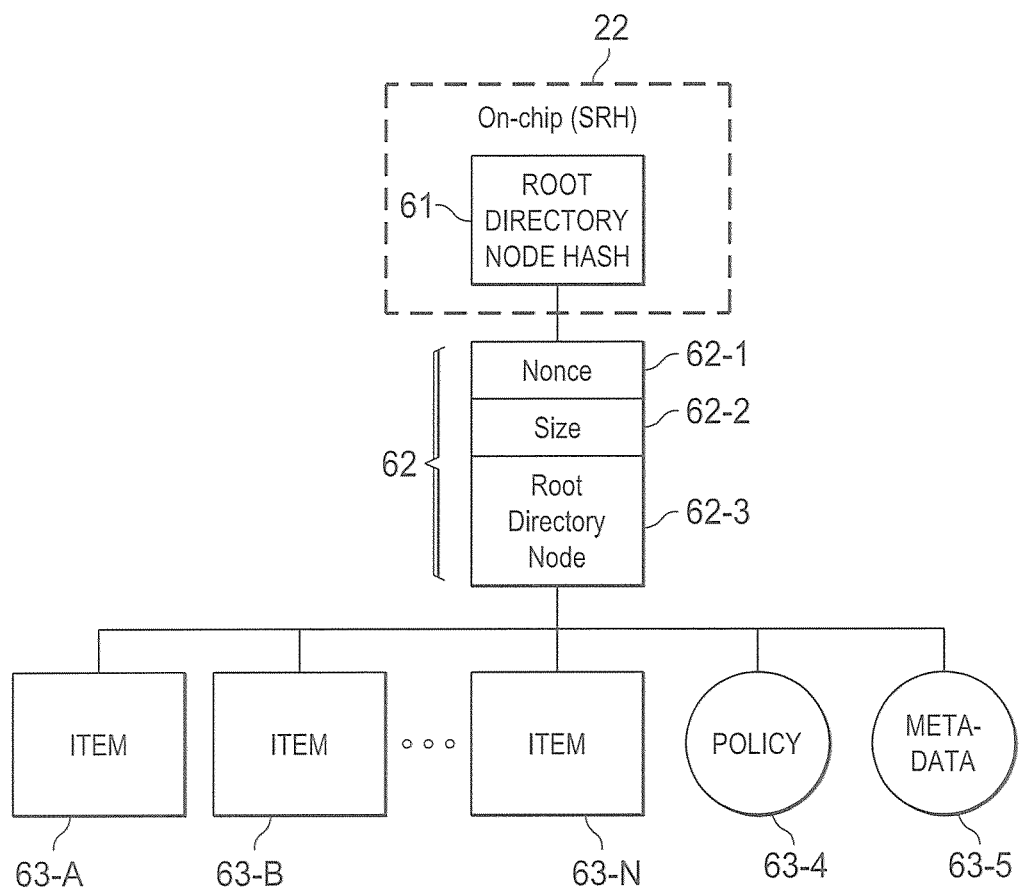
FIG. 5 is a partial chart of one embodiment of a root directory node structure.
FIG. 6 shows one example of a simple secure local storage tree with only one level of items.

FIG. 4A shows one embodiment of the secure local storage, using a basic tree structure. All non-leaf nodes are directory nodes (DNs) (such as node 41) and store special metadata (e.g., the identifier (ID), type, nonce, MAC, size, and location on disk—as depicted in FIG. 5) about their child nodes. Leaf nodes can store not only keys, but also data, additional metadata (42-5), and access control policies (42-4). The additional policy nodes (42-4 and 43-4) and metadata nodes (42-5 and 43-6) provide additional information and policies which apply to all nodes that share the same parent. For example, policy node 42-4 specifies how the keys and data stored in nodes 42-1, 42-2, and 42-3 can be used, and is applied recursively to any children of these nodes as well. These policies will be enforced by the TSM when any access is made to these keys or data. Thus, policy 43-4 applies to item 43-1 (and its children which contain data and keys) but not to items 42-1 or 42-3.

Figure 4B:
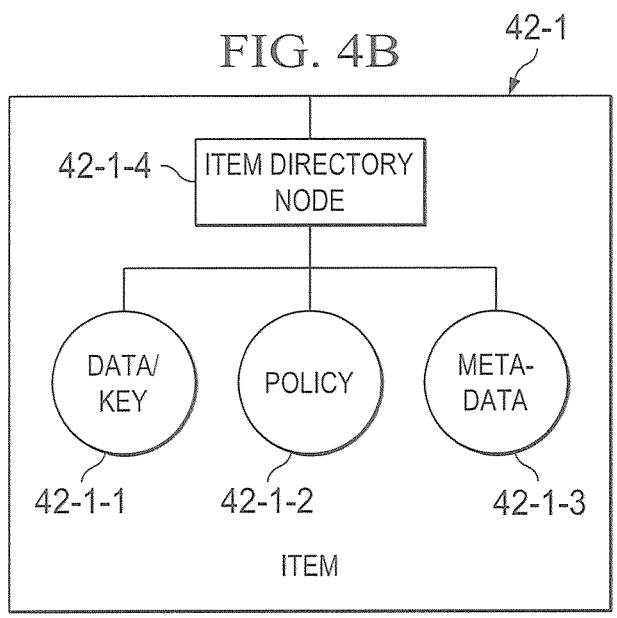
FIG. 4B shows one embodiment of an item structure.

FIG. 4B shows one embodiment of an item structure (42-1) and is actually a collection of nodes: a directory node (42-1-4) and nodes which then contain keys or data (42-1-1) along with their respective policies (42-1-2) and metadata (42-1-3).

The secure storage structure is built on top of insecure storage facilities and must be protected from attacks while on disk or in main memory. Each node in the structure is encrypted with a derived key generated from the DRK using a nonce stored in its parent DN. A different derived key, using the same nonce, is used to generate a keyed-hash (MAC) of the contents of the node. The resulting Merkle hash-tree is incorporated into the secure storage structure by storing the MAC in the DN. A nonce is a number used only once, preferably a random number but it could be any number provided it does not get reused, or at least does not get reused for a very long period of time determined accordingly to the security needs of the application. When data is first added, a nonce is chosen. The nonce is then saved to regenerate the same derived key for later decryption and integrity verification.

FIG. 5 is a partial chart of the DN structure and contains metadata identifying the nodes, their type (item, policy, etc.), size and location on disk. A chain of IDs can trace a path through the tree to reach a particular node, such as "0:2:7" for node 7 (43-4) in FIG. 4A. When the TSM reads a DN, it can use the Type field to quickly identify any policy nodes that apply to a key or data node without decrypting each node. Once found, policies are enforced by the TSM and are inherited hierarchically from parent to child; conflicting policies are enforced by allowing policy nodes lower in the tree to override general policy set by a parent or ancestral node. Any descriptive or application-specific metadata (e.g., cipher type, creation date) can be stored in a separate metadata node.

Data nodes and key nodes are distinguished with different types (not shown in FIG. 5) so that specific policy can be set to control keys preventing them from being leaked as data. The policy node can contain an Access Control List (ACL), indicating which users are allowed access to the data or key, and under what conditions. The policy may include generic read write permissions, limits on the number of accesses, expiration dates, or type-specific access control such as which queries can be made to a database. Policy nodes can also contain general configuration for the Authority's software, such as user customizable settings. The format for policy files is determined by the Authority's software and can be implementation specific. Secrets used for user authentication are similarly stored in the tree.

FIG. 6 shows one example of a simple storage tree with only one level of items, such as items 63-A to 63-N, policy 63-4 and metadata 63-5. At the root of the tree is a special DN, the Root Directory Node (RDN) 62-3. Unlike all other DNs, the RDN does not have a parent to store its directory entry. Instead, the TSM is hard-coded with a location to find its nonce 62-1 and size 62-2 (both unencrypted), and the DRK-encrypted contents of the node. The Root MAC 61 (or alternatively, unkeyed-hash) is stored in the on-chip SRH register 22 (FIG. 2)) where it is protected from attacks. Note that Root Directory Node Hash 61 can be an unkeyed hash (rather than a MAC, which is a keyed-hash), since it is stored securely on-chip and accessible only by the TSM.

In alternate embodiments, a different secure storage (different from those described above), or an unstructured storage area, may be constructed whose integrity may be ultimately protected by at least one data register that is accessible only by the TSM. Those data registers are on the chip containing the processor and safe from physical probing.

Derived Keys

Secrecy of the secure storage is rooted in the DRK. Since the DRK is a critical secret used to maintain the trust relationship with the Authority, it must never be revealed to any software on the device including the TSM. Instead, the TSM derives new keys from the DRK, using a new processor instruction, DRK_Derive (see FIG. 3). This instruction performs a cryptographic hash function to combine the DRK with a value or nonce provided by the TSM using the SRH. These derived keys are used to encrypt the nodes of the secure storage structure. As a result, the keys in secure storage are bound to the device and cannot be read (decrypted) or modified (without detection) by non-TSM software.

For more general purpose use of derived keys, the value provided to the hardware by the TSM can include a constant that can be used to distinguish keys used for different purposes, e.g., communications versus storage. It also includes one or more nonces (as previously defined) to make each key unique. (Random numbers can also be used instead of nonces.) When the software needs to regenerate a particular key, such as an encryption key for secure storage, the nonce is saved with the data and reused by the TSM to obtain the derived key. Similarly, if the Authority and the device need to produce the same key, they can exchange nonces and generate the same derived key, with the Authority deriving the key from its copy of the DRK maintained in a secure environment. On the device, the TSM is responsible for protecting the secrecy of the derived keys that it produces, however the nonces and the constants that are combined with the secret DRK to generate the derived keys need not be secret.

FIG. 7 shows an example of derived keys for storage and for communications. The storage keys are derived using a constant, $C_{Storage}$, and a different nonce for each storage node. An additional set of constants, $C_{Enc}$ and $C_{MAC}$, distinguish keys used for encryption and hashing, respectively, of storage nodes. Derived keys that will be used as session keys for secure communications and remote attestation can be derived using a different initial constant, $C_{Comm}$, along with nonces that ensure freshness from the Authority ($N_A$) and the device ($N_D$). Additional constants, $C_A$ (from the Authority) and $C_D$ (from the device), provide different keys for each direction of communication. Note that both encrypting and hashing are based upon the cryptographic key registers (and not the hash value register). This protection of secure data should apply to any data that was generated by the TSM, that will be stored on disk or outside of secure memory or protected registers.

Mutual Authentication, Remote Attestation and Secure Communications

Before starting a secure communications session, the Authority and the SP-enabled device first mutually authenticate each other by proving that they each still have the same DRK value. This is also a form of remote attestation by the device: for a device, remote attestation is the process of proving to the Authority that it still has possession of the correct DRK and is still running the correct TSM software bound to the DRK value, which properly uses and protects its keys. Mutual authentication and remote attestation are necessary when establishing communication channels between the Authority and its device in the field. Note that this is a different and more lightweight "attestation" than that used in TPM-based systems (Trusted Platform Module, specifications described in www.trustedcomputinggroup.org, hereby incorporated by reference therein), where remote attestation means verifying the integrity (cumulative hashes) of every level of software running on the machine, up through the desired application level. It is also a lightweight (and much faster) mutual authentication, when compared to the public-private key mutual authentication mechanisms.

To establish communications, the parties first need a channel over the public untrusted network. This channel is then secured by generating a session key which can encrypt and hash all messages. The session key will be a derived key based on the DRK, which (as discussed above) is a secret shared only by the Authority and this particular device. No other parties, except the Authority and the device's TSM, can produce the correct session key. Consequently, using a correct derived key proves knowledge of the DRK, so setting up a working secure channel implicitly serves the purposes of mutual authentication and remote attestation, while generating the session key.

Since no other party knows the shared secret, as discussed above, attestation also serves as a form of mutual authentication in the sense that the device and Authority both know that the other has the same DRK. The Authority knows it is communicating with a good TSM on a device that it can trust. It can send new secrets and policy, knowing they will be properly protected by its own signed TSM. It is also assured that any data or messages sent back from the device, through this secure communication channel must have been generated by its TSM. Similarly, the device has authenticated the Authority, so it can incorporate new keys or policies sent to it over this secure channel.

FIG. 8A shows one embodiment of a challenge-response protocol used to generate session keys and attestation. Either side (the device or the Authority) can initiate the protocol, (step 801) during which both sides select a nonce and transmit the nonce in plaintext, steps 802 and 803. The nonces are combined with the constant prefixes to generate the derived session keys, KAD (Authority to devices step 804) and KDA (device to Authority, step 805). The device generates these two derived keys, KAD and KDA, using the DRK_Derive instruction in hardware, while the Authority generates the same two derived keys in software (or its own hardware) on its own systems. Note that the semicolon in the beginning of lines 804, 805, 808 and 809 indicates a "comment" on what is done at the Authority A or the device D, but not transmitted over the network in the network protocol.

Once these keys are established, the parties each send (step 806 for the Authority and step 807 for the device) a Message Authentication Code (MAC), a keyed hash of the combined nonces, using their session key as the key for the MAC. Verifying these MACs (steps 808 and 809) confirms that no man-in-the-middle or replay attack has occurred, and that the Authority and device share the same session keys. This verification requires each side to generate both of the uni-directional keys (steps 804 and 805) using one key to send messages, and another key to decrypt and check received messages. These session keys can be used for secure communications, using a standard protocol such as TLS-PSK, IETF Network Working Group "Pre-Shared Key Ciphersuites for Transport Layer Security (TLS)," Request for Comments: 4279, hereby incorporated by reference herein which initiates the TLS protocol using pre-shared keys.

FIG. 8B shows the network transmissions of the protocol used in this embodiment such that lines 820 and 822 show what the device sends to the Authority and line 821 shows what the Authority sends to the device.

Device Initialization

As discussed above, the Authority initially establishes trust in a device at its trusted location using physical access to install the DRK. This new secret DRK is generated randomly by the Authority for each device and is therefore independent of the manufacturer, any other device, and any past use of the device. The Authority saves a copy of the DRK in its own database along with the device's ID. The Authority then boots the device into the secure BIOS 26 (e.g., by setting a hardware jumper). The secure BIOS bypasses normal boot-up from a BIOS 27 (FIG. 2) and executes a verified initialization routine from its ROM, which executes entirely within the security perimeter of the processor chip, using only on-chip caches. The routine saves the new secret in on-chip DRK register 21 (FIG. 2). The jumper is removed and the device is rebooted from the system BIOS. In any subsequent power-on boot-up (without the jumper), the initialization routine is skipped. Instead, the secure BIOS, being invoked before the system BIOS, executes only the DRK_Lock instruction before passing control to the regular system BIOS 27 (FIG. 2) for a normal boot-up.

The TSM, which will also be loaded by the Authority, is then signed with the new DRK. This can be done on the Authority's secure computers where the verified TSM code resides. The signing process computes hashes over each cache line using the DRK, and stores them in empty spaces left by the compiler. The signed TSM, and other system code, is then copied to the disk or flash storage on the device.

Next, the Authority initializes the secure storage structures, which, as discussed can store the keys and their associated usage policies and metadata. The Authority must also set up user authentication and authorization data, storing user passwords, biometric data, or users' cryptographic keys and specifying what privileges each user has. All of these policies and secrets are combined and stored in the secure local storage structure. The Authority generates the nonces and derived keys needed to create the structure and performs the encryption and hashing. The encrypted version of the structure is then copied to the device. These data and keys in the secure local storage can be updated in the field via secure communications after deployment.

Finally, before deployment, the Authority uses the new TSM it has installed on the device to load the SRH register on chip with the initial value of the root hash for the secure local storage it has just generated. This value will be updated by the TSM during operation as authorized changes are made to the secure local storage.

Usage Scenarios

The remote trust model discussed herein is applicable to many different scenarios, such as where an Authority entity desires to extend trust to remote devices used in the field. The Authority could be a crisis response entity with devices used by first responders, such as firemen, policeman, etc. The Authority could also be a military organization with remote devices used by soldiers in the field. The Authority could be a bank with devices used by customers as personal ATMs for dispensing electronic cash and accepting deposits into bank accounts. The Authority could even be a cell phone network provider allowing users to download software to their phones while having trusted network-access software. Any number of different systems can be envisioned using the concepts discussed herein, however, system operation will be discussed in terms of a detailed usage scenario for crisis response.

For crisis response, transient access to keys is provided which enable access to protected (encrypted) data when the crisis starts and access to those keys is revoked when the crisis ends. At all times, the confidentiality of these keys is maintained. Even if a device is lost or stolen, the confidentiality of the keys, and hence the sensitive data they protect, is maintained.

First responders can use their device (e.g., secure PDA, personal computers, cell phones) for both critical and non-critical applications. Non-critical applications include e-mail, web browsing, instant messaging, voice chat, etc. These do not use the TSM and may involve off-the-shelf or downloaded software that must not put at risk the sensitive data made available to crisis responders. For critical applications, sensitive data will be needed, such as firefighters accessing building plans and occupant information, or paramedics accessing medical records when they get to the scene of an accident. For these situations, the Authority may distribute secrets and access policies in advance of a major crisis, in addition to data obtained as needed securely over the network.

After authenticating to the TSM, the sensitive information on the device will only be available to the responder through the controlled interfaces of the TSM. For example, this might mean that the paramedic can read a patient's allergies and medical history but not access the psychiatric portion of his/her medical record. Rate limiting might also be employed, so a paramedic can access a few, but not hundreds of records at any one time.

Preparation

The Authority makes access control decisions in advance for many likely crisis scenarios so the response can be quick when a crisis does occur. For example, to give the firefighter access to floor plans and building occupants, data for all buildings in a city should be prepared in advance. When a crisis occurs, the city's crisis response Authority can decide which data to make available based on which parts of the city are affected. The city Authority will negotiate access rights with building owners and hospitals in advance and decide how to delegate rights to individual responders using devices it will distribute. The city Authority forms trust relationships with each of these third parties in advance, setting up a certificate Authority (e.g., using X.509 certificates—"ITU-T Recommendations X.509, The Directory: Authentication Framework", Int'l Telecomm. Union Geneva, 2000; ISA/IEC 9594-8, hereby incorporated by reference herein) so it can specify access rights and allow devices and third parties to authenticate each other during the crisis.

When a crisis begins, the Authority will create and sign certificates for each device, tagged with a crisis ID and a reasonable expiration time. The Authority then communicates with each device, which performs remote attestation that it still has the correct DRK and DRK-signed TSM. It then distributes the necessary keys, along with the certificates for third party data and their associated access policies.

Crisis Operation

During the crisis, responders can contact third party data sources directly, via their devices, to retrieve sensitive data which they are pre-authorized for by the Authority's certificates. Since the certificates will be stored securely on the device by the Authority and signed by it, this is sufficient to authenticate the device to a third party. However, for more complicated scenarios, the Authority can give each device its own public private key pair which it can use to authenticate directly to the third party.

Devices can also contact the Authority during a crisis to obtain additional keys and access rights while in the field. Unanticipated circumstances will require access to data beyond what was pre-authorized. For example, "need-to-know" may be determined in the field for responders to have access to additional data. Alternatively, some additional data can be sent in advance for offline enforcement, to be revealed by the TSM only if needed. Devices may also obtain some data directly from the Authority or send data back to the Authority.

Revocation Post-Crisis

Access to sensitive information must be revoked after a crisis has ended. This is accomplished through a combination of three revocation mechanisms. First, all secrets given to the device are policy-controlled and will include limits on use, including a maximum number of accesses and/or an expiration date. So as not to cut off access while the crisis is still going on, these restrictions must necessarily give a wide safety margin. This first line of defense is effective even when the device is operating off-line.

Second, the Authority can directly cut off access by contacting each device to delete secrets and modify the stored policies. The TSM will confirm that the revocation was successful and that the secure storage structure and SRH register are updated. The TSM can also report back what accesses had been made during the crisis. Knowing that accesses will be audited will provide a disincentive for abuse by authorized users.

Third, access to new secrets and data will be cut off, both from the Authority and third parties. The Authority will contact each third party and report that a particular crisis ID is no longer valid, or will revoke certain certificates. Any certificates that specified this ID will no longer be accepted for access, while general certificates for day-to-day use are still available. A new crisis ID can be used for the next crisis or another phase of the same crisis.

Protection of Authority Registers

The security provided by the architecture discussed herein is rooted in trust in the new processor features. Since the processor chip is in the physical security perimeter, the new hardware registers can only be accessed through software instructions the architecture defines. At no time is there an instruction that reads the DRK register, and only someone with physical possession of the device using the secure BIOS and jumper (or other physical mechanism) can write to the DRK register. Therefore, the DRK register contents can not be observed outside the processor or copied to another device and can not be modified except under secure BIOS execution.

(If the secure BIOS fails or is not implemented, then attacks on overwriting the DRK register can cause a denial of service attack for the device and its user, but cannot violate the confidentiality or integrity properties of the protected information.) Similarly, only correctly-signed TSM software can use instructions for accessing the SRH register and for deriving keys from the DRK. Since the TSM is the Authority's own correct, trusted software, no other software can observe or modify the SRH or generate derived session keys from the DRK.

Protection of TSM

The dynamic Code Integrity Checking for the TSM instructions ensures that it remains unmodified throughout its execution. This defends against dynamic hostile code insertion attacks, in addition to static changes to code on the disk. Also, Concealed Execution Mode (CEM) ensures that secure intermediate data and general registers, during TSM execution, cannot be observed or modified without detection. If a modification is detected, the processor raises an exception; the TSM operation will be aborted and processor registers cleared. These mechanisms guarantee that a TSM will be protected during its execution, similar to the user-mode devices discussed in the above-identified APCSM article.

However, the Authority-mode architecture provides additional trust guarantees over user-mode. Since TSM code can only be hashed with the DRK, which is only known outside hardware by the Authority, no new TSM code can be added to a device by an adversary without changing the DRK. Thus, the Authority can check that its unmodified TSM is running by having the device attest to having the same DRK value shared with the Authority. If an adversary tries to modify TSM code or install new TSM code by replacing the DRK, the derived keys generated by the new TSM, based on this new DRK, would be different and the device will be unable to attest itself. Also any data encrypted by the Authority's TSM will no longer be accessible. As a result, data written by or belonging to any TSM is bound to that TSM. No other software is trusted with the Authority's data or with policy enforcement, so integrity checking is only necessary for the TSM.

Protection of Persistent Secure Data

All data from the Authority that starts out under control of the TSM will remain secure as long as the TSM handles it properly on the device. The Authority will write and test the TSM to ensure this property, making use of the persistent secure storage structure. In secure storage, confidentiality is protected with DRK-derived keys so that stored data can only be read by the TSM. Integrity is based on a hash tree rooted in the on-chip SRH register. That register can only be modified by the TSM, which is continuously installed as long as the DRK is unchanged. If the TSM were replaced, a new TSM could access the old value of the SRH, however, this value is meaningless without access to decrypt the data in the rest of the local secure storage structure. While the new TSM could change the SRH, the DRK can never be changed back to the original value, except by the Authority. This new adversarial TSM will be useless, since the device can no longer attest the old DRK to the Authority.

Remote Attestation, Mutual Authentication and Communications

Remote trust also involves secure communication, mutual authentication and attestation, which is based on the Authority and device sharing the DRK secret. Remote device attestation and mutual authentication require each side to prove knowledge of the DRK through the challenge-response protocol. Hence, the Authority-mode protocol enables the Authority to know that the device still has the shared DRK, and enables the device to know that it is speaking to the correct Authority, i.e., one that knows the shared DRK. Nonces prevent replay attacks on the exchange and are also used to generate session keys for communication. Man-in-the-middle attacks are not possible since no other party can generate the correct derived keys to be used as valid session keys.

Once the Authority knows its original DRK is still in the device and was used to correctly generate derived session keys, used for setting up the secure communications channel it can be certain that only the TSM code that it originally signed with this DRK is running on the device and taking part in the communications. In fact, stronger than the integrity checking done only on program launch by TPM based systems our system uses dynamic Code Integrity Checking during the fetching of cache lines for the TSM throughout its execution. It is safe for the Authority to transmit new data to the TSM, knowing it is continuously integrity-checked and protected by the DRK.

Policy-Controlled Secrets

In this architecture, keys and policies cannot be separated without modifying or deleting nodes from the secure storage tree, which requires modifying other parent nodes, and ultimately modification of the root hash stored in the SRH. More generally, spoofing attacks on secure storage would include deliberate modification or insertion of data into the structure. The integrity checking will detect any such changes, and the MAC entries themselves cannot be spoofed without knowledge of a DRK-derived key. If nodes could be rearranged, duplicated or removed, it would also affect the application of access control policies. Since each node or subtree is self-contained and independently hashed, parts of it can be reused at lower levels. However, the parent of each node is a DN that lists its children and their MACs in order. Any such splicing attacks on the secure storage tree structure would be detected when the MAC of the parent is checked. Since the TSM performs checks all the way to the root SRH which is on-chip and safe from attack, it is guaranteed to detect any illegitimate changes. Therefore, the Authority knows that an access policy stored on the device cannot be modified and will be enforced by the TSM which is dynamically-verified during execution.

Transient Trust

Replay attacks on memory and disk storage are a threat to revocation, which is essential for transient trust. This is especially critical for data in the persistent secure storage tree. If the entire storage tree can be replayed, then any policy updates or revocation of keys or data performed by the Authority could be undone. However, since the root hash is stored on-chip, out of reach of any adversaries, this is not possible since previous trees will not be valid. The only way to add or remove data from the tree is through the TSM, but the TSM will only make legitimate modifications specified by the Authority during secure communications or through previously set policy.

Transitive Trust

This is based on the TSM's use of secrets and the Authority's trust relationships established with the device and the third parties. These components are all individually assured, so the TSM's implementation of transitive trust will be maintained.

Other Issues

In addition to the TSM, it is expected that other trustworthy system software (e.g., a security kernel and secure I/O drivers) will be present to assist with user authentication and secure display of data to the user. These are orthogonal issues to this architecture and therefore not discussed in detail herein. Without trusting these mechanisms, the Authority's TSM cannot guarantee that data displayed to the user will not be copied by some software. Therefore, there is responsibility on an authorized user to use the device appropriately. This is a reasonable tradeoff since users can always reveal the data once it is outside of the device. An authorized user can remember the data and reveal it later. This invention (or any digital device) cannot defend against such "analog" or human revealing of data by an authorized user. The user should not intentionally login and access data when he/she knows the system to be physically compromised, and should not replace the system software and continue to access the TSM. The TSM and policies should set up controlled interfaces to release data to the user in as safe a way as possible, mitigating any risk from data leaked while being displayed. Only data being displayed in clear text (i.e., unencrypted) is vulnerable in this way. Other secrets accessed by the TSM or stored securely on the device but not displayed to the user can not be leaked.

The threat model used herein does not defend against denial of service attacks, which prevents a guarantee of availability of service or of protected information. Attacks on the TSM code, TSM execution, communications protocol, secure storage structure, etc., will all be detectable, but no defined recovery mechanisms are discussed herein. This is acceptable under our threat model, but less acceptable for a device relied upon in a crisis. While our architecture does not require trust in system software to provide remote attestation or protect the Authority's secrets, the best defense for availability is to install a secure OS that can protect itself from untrusted applications and remote exploits, and for the user to maintain physical control of the device.

TPM can also be used in conjunction with this invention to provide assurance of the integrity of the system software upon launch or reboot, and to establish a known good secure initial state for the system. This invention further extends the security provided by TPM.

Our preferred architecture uses strong ciphers and 128-bit symmetric keys and random nonces, which should be adequate. Implementations could easily be changed to increase these sizes or to use different algorithms if necessary. By using different constants depending on the protocol used, derived keys are always made specific to their purpose, helping to prevent attacks from key re-use in different protocols.

Performance

Non-TSM software is basically unaffected by the new hardware since it will never trigger CEM protection or access the new registers or instructions. Furthermore, the security of authority TSMs and secrets does not depend on limiting other software or verifying the entire software stack. Therefore, there is a negligible performance impact for system software and applications that do not use the TSM.

TSM software will incur a slight performance penalty (see the APCSM article), but this penalty only impacts the small module where security is critical and a slight delay is acceptable. One potential source of delay is for Code Integrity Checking (CIC) of TSM code and Concealed Execution Mode (CEM) checking for secure loads and stores. These both occur only at the cache-memory boundary upon the rare L2 cache miss, where the miss penalty is already several hundred cycles for typical microprocessors. Hence, some tens of extra cycles for hardware hash computation and symmetric-key decryption or encryption is not going to cause much performance degradation. Once inside the L2 and L1 caches, accessing secure instructions and data proceeds as fast as before, since the checking of the 1- or 2-bit tags for a cache line (that already been verified) is very fast.

CIC checking inserts additional no-op instructions into the instruction stream for each cache line. These will cause some degradation in the efficiency of the instruction-fetch process (since a fraction of instructions fetched are useless), but in a modern out-of-order processor, this should have insignificant effect on execution throughput. CEM interrupt protection requires the encryption and hashing of the general registers, but interrupts are relatively infrequent compared to the other factors.

The final component affecting performance is the design of the TSM software itself. Rather than directly accessing unprotected secrets, the TSM will perform additional cryptographic operations to retrieve secrets. For example, navigating the storage tree requires traversing nodes in the tree, each of which requires generating two derived keys in hardware which are used to check hashes and decrypt the node with software operations. Additional data may have to be retrieved from disk, involving the OS to access the file system, therefore causing additional system calls and memory or disk accesses, and possibly affecting cache behavior. We have designed the secure storage tree navigation to predominantly use symmetric-key operations which are significantly faster than asymmetric-key operations. Therefore, we expect the effect of these additional operations to be small while providing significant additional security. Furthermore, the storage integrity checking requires Merkle tree hash operations only on the persistent secure storage tree, not on the whole storage. This results in very significant reduction in performance overhead.

In another preferred embodiment of the current invention, we describe simpler embodiments suitable for resource-constrained devices such as sensor nodes. These are devices where it is acceptable to disable interrupts during the running of TSM code. In one such embodiment, called the Reduced Sensor Mode SP (described below and in FIG. 9), the TSM is also small enough to fit completely in non-volatile storage on chip: within the physical security perimeter.

Key Management Architecture for Sensor-Node Fabrication Attacks

There are two main classes of key management schemes in lightweight ad hoc networks: deterministic, as discussed in articles entitled S. Zhu, S. Setia, and S. Jajodia, "LEAP: efficient security mechanisms for large-scale distributed sensor networks" in CCS'03. *ACM conference on Computer and communications security*, New York, N.Y. 2003, pp. 62-72; J. Lee and D. Stinson, "Deterministic key predistribution schemes for distributed sensor networks," *Selected Are is in Cryptography*, 2004; S. Camtepe and B. Yener, "Combinatorial design of key distribution mechanisms for wireless sensor networks," *European Symposium On Research in Computer Security* (ESORICS '04), 2004; S. Zhu, S. Setia, S. Jajodia, and P. Ning, "An interleaved hop-by-hop authentication scheme for filtering of injected false data in sensor networks," *Security and Privacy*, 2004. *Proceedings.* 2004 *IEEE Symposium on*, pp. 259-271, 2004, all of which are hereby incorporated by reference, and probabilistic, as discussed in articles entitled, L. Eschenauer and V. D. Gligor, "A key-management scheme for distributed sensor networks," in *CCS'02: ACM conference on Computer and communications security*, New York, N.Y., 2002, pp. 41-47, hereafter referred to as the EG scheme, H. Chan, A. Perrig and D. Song, "Random key pre-distribution schemes for sensor networks," in *IEEE Symposium on Security and Privacy*, 2003; R. D. Pietro, L. V. Mancini, and A. Mei, "Random key-assignment for secure wireless sensor networks," in *SASN'03: ACM workshop on Security of ad hoc and sensor networks*, New York, N.Y., 2003, pp. 6271; W. Du et al., "A key management scheme for wireless sensor networks using deployment knowledge," in *INFOCOM'04*, March 2004; J. Hwang and Y. Kim, "Revisiting random key pre-distribution schemes for wireless sensor networks," *ACM workshop on Security of ad hoc and sensor networks*, pp. 43-52, 2004; S. Zhu, S. Xu, S. Setia, and S. Jajodia, "Establishing pairwise keys for secure communication in ad hoc networks: A probabilistic approach," in *ICNP '03*, 2003; W. Du, J. Deng, Y. S. Han, and P. K. Varshney, "A pairwise key predistribution scheme for wireless sensor networks," in CCS'03: ACM Conference on Computer and communications security. New York, N.Y., 2003, pp. 42-51; D. Liu and P. Ning, "Location-based pairwise key establishment for static sensor networks," in *1st ACM Workshop on Security of Ad Hoc and Sensor Networks,* 2003 all of which are hereby incorporated by reference.

A typical deterministic algorithm preloads each node with a single common (long-term) key, while in a probabilistic approach, the long-term keys in each node's key ring are randomly chosen from a large key pool. Once deployed in a mobile network, long-term keys are used for mutual authentication between pairs of neighboring nodes (i.e., nodes within each other's communication range) to establish pairwise keys for future communication. When neighboring nodes do not share a long-term key, they will relay through another node that is within their communication range to set up a pairwise key. Pairwise key establishment and future communication can be eavesdropped by other nodes within the communication range, provided those nodes also have the corresponding long-term or pairwise key.

There are several metrics for evaluating various key management schemes. One metric is link connectivity, which is defined as the probability of being able to set up pairwise communication directly between two neighboring nodes that are within communication range. Obviously, the link connectivity of the single-common-key deterministic scheme is 100%, while that of a probabilistic approach is the probability of sharing at least one long-term key between two neighboring nodes. In general, probabilistic approaches end up with a larger key pool, many more keys per node, and poorer link connectivity than the deterministic approaches. More related references can be found in S. A. Camtepe and B. Yener, "Key distribution mechanisms for wireless sensor networks: a survey," Rensselaer Polytechnic Institute, Computer Science Department, Tech. Rep. TR-05-07, March 2005, available at http://www.cs.rpLedulresearch/pdf/05-07.pdf; D. Xu, J. Huang, J. Dwoskin, M. Chiang, and R. Lee, "Re-examining probabilistic versus deterministic key management," in *ISIT'07*, Nice, France, 2007; which are hereby incorporated by reference.

Another important metric is Successful Attack Probability (SAP) for node-capture attacks. An attack on a pairwise link between two authorized nodes is successful if a compromised node can intercept and decipher the information transmitted through that link. SAP will be dependent on network scenarios, which can be categorized as static networks or mobile networks.

In a static network where sensors do not move after deployment, both the deterministic approach (e.g., single common key scheme) and the probabilistic approach (e.g., EG scheme) can provide perfect resilience if nodes are captured only after all pairwise links have been established. By exchanging messages encrypted with the initial common key (deterministic) or a shared key (probabilistic), two neighboring nodes can generate a random pairwise key, which is known only to them. The pairwise keys cannot be deduced by a captured node (that is not one of the pairwise nodes whose communication is being spied on by the attacker) even if the initial long-term keys are later disclosed. Thus the SAP is close to zero. To ensure further security, the initial long-term keys can be deleted from memory permanently after deployment. In the single common key scheme, this single common key must be deleted. This is why the network is called a "static network". No new nodes can establish pairwise keys after the common key in the deterministic scheme, or long-term keys in the probabilistic scheme, are deleted.

In contrast, in a mobile network, nodes are constantly on the move and often need to establish new links. Examples include networks of buoys floating freely on the ocean to gather environmental data as discussed in S. Seys and B. Preneel, "The wandering nodes: Key management for lower-power mobile ad hoc networks," in *IEEE International Conference on Distributed Computing Systems Workshops. ICDCSW'05*, 2005; and networks of sensors moving around in an unknown environment to form reasonable coverage as discussed in A. Howard, M. J. Mataric, and G. S. Sukhatme, "Mobile sensor network deployment using potential fields: A distributed, scalable solution to the area coverage problem," in *Distributed Autonomous Robotic Systems,* 2002; both of which articles are hereby incorporated by reference herein.

In a mobile network, the single common deterministic key scheme could lead to an SAP as high as 100%, if the common key is obtained by an adversary before any link is established. However, the EG probabilistic scheme is also quite vulnerable as shown in the above-identified article "Re-examining probabilistic versus deterministic key management." The value of SAP for the EG scheme can be as high as 60% if the adversary can fully utilize the keys obtained from several compromised nodes (i.e., a node fabrication attack). The reason is that in a probabilistic approach, in order to increase link connectivity, key-relay is required. By intercepting the key information that is being relayed, a compromised node can determine the key which the two authorized nodes will use for future mutual communication. This man-in-the-middle attack opportunity can significantly increase the value of SAP for a probabilistic approach, since there is a high chance of using a relay for link establishment in a mobile environment. By combining the keys from multiple captured nodes to fabricate new nodes in the networks the adversary increases his likelihood of being used as a relay in this scheme and succeeding in an attack.

Preventing node fabrication from long-term keys stored in captured nodes is critical to improve the security levels in both deterministic and probabilistic key management schemes. As will be discussed below, we propose two secure-hardware-based techniques, specifically targeted to the sensor-node platform, that protect long-term keys for both deterministic and probabilistic key management schemes for mobile networks. This ensures that protected secrets cannot be extracted from a captured node.

Sensor Network Scenario and Threat Model

For the discussion below, we consider a probabilistic key management scheme in a mobile network. The assumption is made that sensor nodes are initialized at a secure location by an Authority and that attacks are not possible during this process. As it receives devices from a manufacturer, the Authority is responsible for initializing the software and the security mechanisms of the node. The Authority serves as the primary trusted party that generates and installs long-term keys and authorizes devices for the sensor network. This operation is performed in the manner discussed above for the computing device model.

In a node capture attack, an adversary compromises one or more sensor nodes and extracts their long-term keys after deployment. The adversary then tries to obtain the pairwise keys used by other nodes so that it can later monitor their links. If it shares the long-term key used by two nodes for key-establishment, it can observe the corresponding negotiated pairwise key between those two nodes. Alternatively, if the two nodes do not share a long-term key, they may choose to relay through the compromised node which can save the resulting pairwise key. In both cases, the adversary is limited to attacking nodes within its communication range.

In a node fabrication attack, the adversary uses the extracted keys to fabricate new nodes. One method is to simply clone the compromised node, using additional sensor devices loaded with an exact copy of the keys from the compromised node. Another method pools the keys from multiple compromised nodes; it then either makes fabricated nodes with unique subsets of the combined key pool or fabricates super-nodes using all of the extracted keys in each copy. Cloning and node fabrication allow the adversary to significantly increase the SAP compared to a node capture attack.

The crucial observation is that the attacks succeed because the long-term keys are not protected when a node is captured. We assume an adversary with physical access to the device, so software protections are easily bypassed. The keys in our system are not accessible to the software on the node, as discussed above, and thus the adversary can not exploit or replace the software. In addition, since the keys are not readable by any mechanism, the adversary can not obtain them from a flash memory chip or other permanent storage when the device is offline.

As discussed above, the solution we propose is based on protecting secrets by storing them inside the System-on-a-Chip (SoC). The chip includes the processor core and main memory, and it is quite expensive for an adversary to remove the packaging and directly probe the registers and memory. The SoC chip can further implement physical tamper-resistance physical mechanisms that will clear or destroy the secrets when probing attempts are detected and also cut power to the chip, erasing any intermediate data based on those secrets. Therefore, the assumption of protected on-chip secrets is valid for a large class of attacks.

Sensor-Mode Secret Protection (SP)

To prevent node fabrication attacks, we must tackle the problem of key extraction from a captured node. We first discuss Reduced Sensor-mode SP, suitable for the simplest sensors. We then extend the solution for slightly more capable sensors. Our work is inspired by the SP architecture proposed for general-purpose microprocessors as discussed in R. Lee et al., "Architecture for protecting critical secrets in microprocessors," in *International Symposium on Computer Architecture (ISCA* 2005), June 2005. pp. 2-13; and J. Dwoskin and R. Lee, "Hardware-rooted trust for secure key management and transient trust," in *CCS'07: ACM conference on Computer and communications security,* 2007; both of which are hereby incorporated by reference herein, but stripped to the bare minimum for sensors with very constrained computing and storage resources.

Reduced Hardware Architecture

Figure 9:
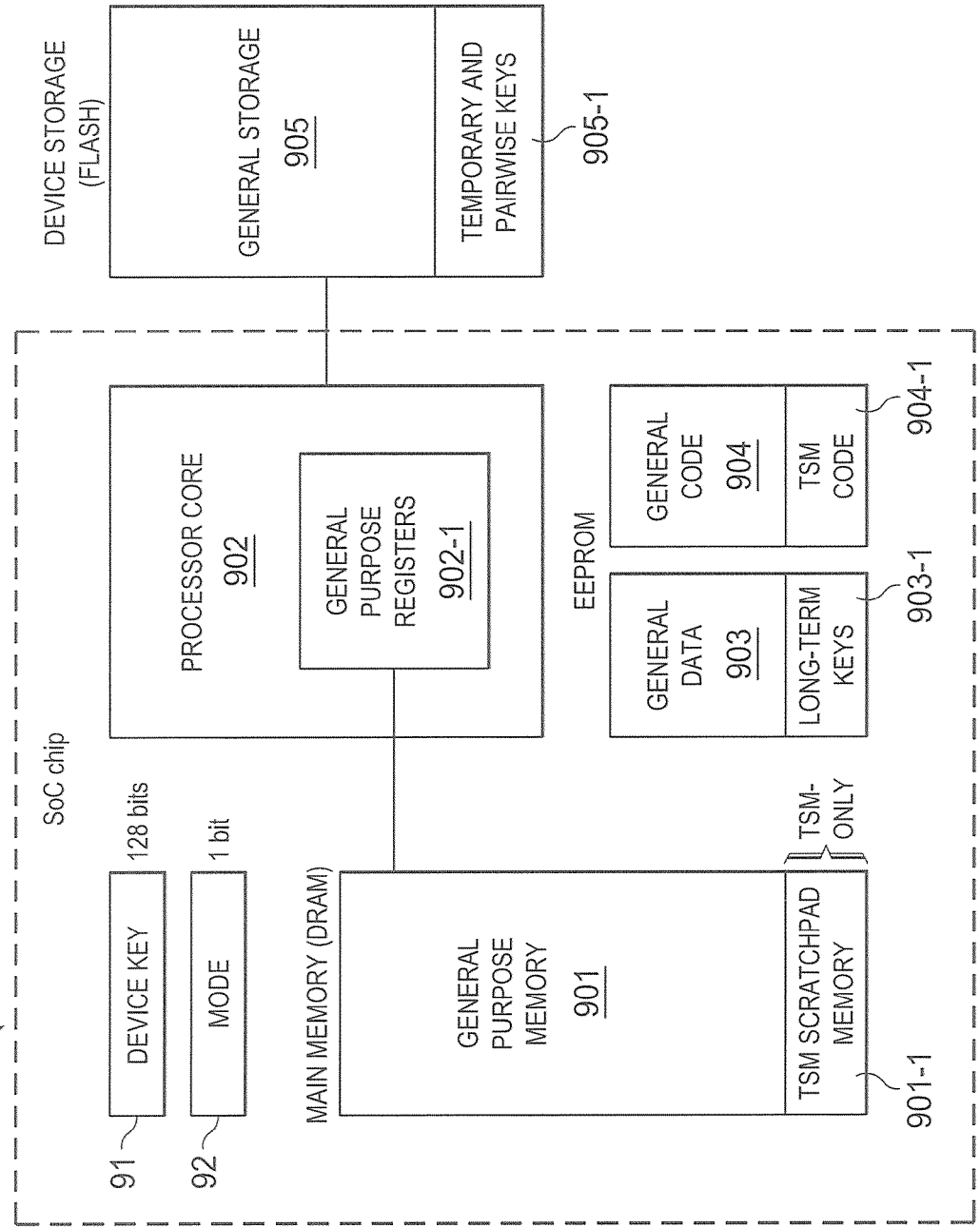
FIG. 9 shows one embodiment of the simplest version of an architecture for a reduced sensor-mode system.

FIG. 9 shows one embodiment 90 of the simplest version of the architecture for the reduced sensor-mode system. This arrangement only requires one new register 91—the Device Key and a single-bit register 92 to indicate protected mode. Additionally, a Trusted Software Module (TSM) 904-1 is stored in the on-chip code instruction EEPROM 904 and the long-term keys 903-1 for the probabilistic key management scheme are stored in the on-chip data EEPROM 903. Also, a portion of the main memory 901 of the node is reserved for the TSM Scratchpad Memory 901-1. Note that 903, 903-1, 904 and 904-1 are any suitable non-volatile memory (not just EEPROM), whereas 901 and 901-1 are volatile memory (e.g., DRAM Dynamic Random Access Memory or SRAM, Static Random Access Memory). Non-volatile memory retains its state across power-on-off cycles, while volatile memory loses its state on a power-off.

The main concept is that the TSM is the only software module that can use the Device Key and the protected long-term keys as discussed above. Since the TSM code is stored within the trusted SoC chip in ROM, it cannot be changed by other software—whether by a malevolent application or a compromised operating system. Similarly, the long-term keys which are encrypted never leave the SoC chip and are encrypted with the device key or with another encryption key derived from it by the TSM. These are refer ed to as the protected keys. Also, any intermediate data which may leak key bits generated during TSM execution is placed in the TSM scratchpad memory, and also never leaves the SoC chip.

The device key is the SP master key and is protected by the processor hardware and can only be used by the TSM running in protected mode and can never be read by any other software. Unlike in the computing device model, here we allow the TSM to directly read and use the device key. If derived keys are desired by the TSM, it can generate them in software from the device key.

When the unprotected software wants to make use of protected keys, it calls the TSM. The TSM functions access the protected keys, perform the requested operation and return the results, never revealing the protected keys themselves to the unprotected software. Each TSM function starts with a Begin_TSM instruction which disables interrupts, sets the protected mode bit, and enters protected mode for the next instruction. Begin_TSM is only valid for code executing from the instruction-EEPROM; any code executed from main memory or off-chip storage cannot enter protected mode at all. The end of the TSM code is indicated by the End_TSM instruction which clears the mode bit and re-enables interrupts. Processor 902 in conjunction with registers 902-1 controls the process and temporary and pairwise keys 905-1 are stored in encrypted form, in general storage 905. The last instruction of FIG. 10, ASH_Set, is not used in the embodiment shown in FIG. 9.

FIG. 10 shows a set of instructions used only by the TSM and for initialization in the Sensor-mode SP architecture.

As shown in FIG. 9, TSM Scratchpad Memory 901-1 is a section of main memory reserved for the exclusive use of the TSM. It is addressed separately from the regular on-chip memory and accessed only with special Secure_Load and Secure_Store instructions (FIG. 10). These new instructions are available only to the TSM, making it safe for storing sensitive intermediate data in the TSM scratchpad memory. The TSM can also use this extra space to spill general registers, to decrypt and store keys, and to encrypt data for storage in regular unprotected memory.

As an alternative embodiment instead of new Secure_Load and Secure_Store instructions, the TSM Scratchpad Memory 901 (in FIG. 9) and 1105 (in FIG. 11) can be addressed using the processor's normal load and store instructions, but with two new hardware registers, Secure_Area_Start and Secure_Area_End, added to the processor. These registers are set by a new instruction "Secure_Area_Add (start, size)," which is available only to TSM code and specifies a range (starting address and size of the region) in the General Purpose Memory 901 (in FIG. 9) and 1105 (in FIG. 11) to be used as the TSM Scratchpad Memory. The value for Secure_Area_End is calculated by the hardware to be the starting address plus the size, but will not go higher than the last valid address in the memory. TSM code can access this address range for the TSM Scratchpad Memory normally, but non- TSM code trying to access the range will either cause a fault or will return null (all zero) data.

Initialization of a new device takes place at the Authority's secure location. First, the Authority must generate a new random device key. Long-term keys and other secrets are encrypted using the new device key and are then stored along with the TSM code on the on-chip EEPROM of device 90. Next, the Authority uses the DeviceKey_Set instruction to store the device key. Finally, any other unprotected software and data can be copied to flash storage 905. Any time the Device Key register is set (or cleared), the processor will automatically clear the TSM scratchpad memory, wiping any intermediate data that was protected by the old key. If in protected mode at the time, the mode bit is also cleared along with the general purpose registers. Similarly, the processor will clear the device key upon writing to either the instruction or data EEPROM 904 and 903; this in turn clears the other intermediate data.

Expanded Sensor-Mode SP Architecture

The Reduced Sensor-mode SP architecture is ideal for the smallest sensor nodes which use minimal software and have very limited resources. In slightly larger lightweight sensor nodes, the software will be more complex. The additional applications that run on this sensor combined with the TSM and long-term keys will be too large to store on-chip. This greater flexibility in the sensor also requires additional support for security.

Figure 11:
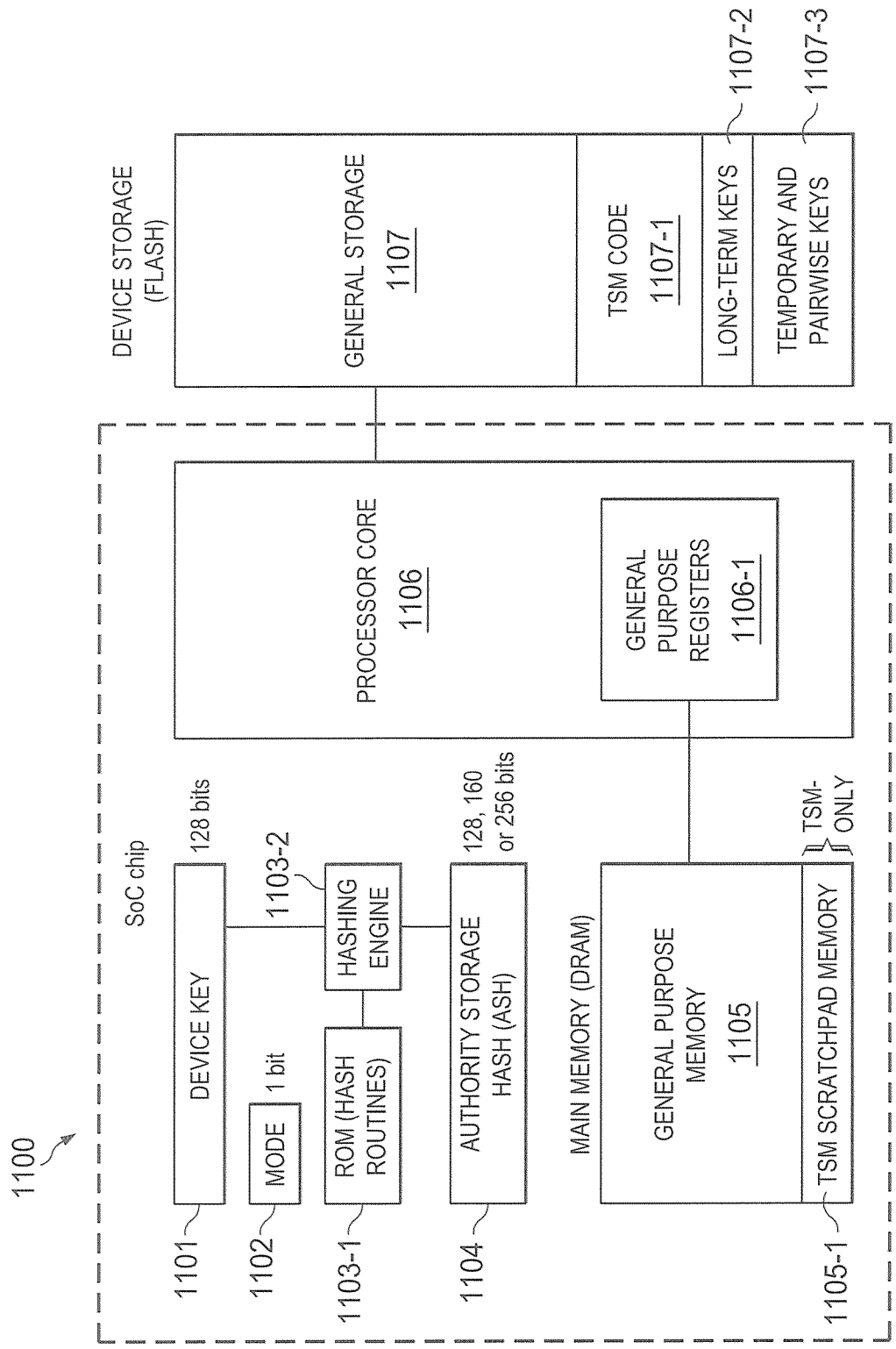
FIG. 11 shows one embodiment of an Expanded Sensor-mode architecture using the concepts discussed herein.

FIG. 11 shows one embodiment 1100 of an Expanded Sensor-mode SP architecture. In this embodiment, TSM code 1107-1 and encrypted long-term keys 1107-2 are moved to the off-chip device (non-volatile) storage 1107 where the temporary and pairwise keys 1107-3 are also stored. This makes the TSM code and long term keys susceptible to modification by other software or through physical attacks. Therefore, we must verify their integrity before they can be used. To do this, we add a new register 1104 called the Authority Storage Hash (ASH), a hardware hashing engine 1103 (implementing SHA-1, MD5, or any desired cryptographic hash function), a small ROM 1103-1, and an additional initialization instruction ASH_Set (FIG. 10).

ASH register 1104 contains a hash over the entire storage region of the TSM code 1107-1 and long-term keys 1107-2. It is set by the Authority during initialization and is rechecked by the processor each time the TSM is called. The ASH_Set instruction sets the ASH register, first clearing the device key to ensure that the TSM can not be replaced and still access the protected keys. The checking code is stored in the on-chip ROM and is fixed and therefore safe from modification. The checking code uses hardware hashing engine 1103-2 to compute the hash over the TSM code and the encrypted keys. Alternatively, the hashing can also be done by software stored in the ROM 1103-1, and hardware hashing engine 1103-2 will not be needed. When Begin_TSM is called, the processor disables interrupts and jumps to the TSM-checking routine. If the hash check succeeds, the protected mode bit, register 102, is set, and execution jumps to the newly-verified TSM code. If the check fails, an exception is triggered.

Attacks on Protected Keys

The Sensor-mode SP architecture safeguards a sensor node's long-term keys, preventing extraction by an adversary in the event of node capture. The keys are always stored in encrypted form in permanent storage in either on-chip (e.g., EEPROM) or off-chip storage. The adversary cannot obtain the device key needed to decrypt them since it is stored on chip and thus protected from probing and reading. The device key thus never leaves its protected software environment. Therefore, rather than access the keys directly, regular software must call TSM functions which perform operations with the keys on its behalf. Thus, software can use the keys in any way permitted by the TSM, but can never extract the keys themselves, even under physical attacks.

1) Node Fabrication Attacks: Without SP protection, an adversary maximizes its SAP by cloning multiple copies of compromised nodes and combining their long-term keys. This increases its ability to observe the pairwise keys generated for link establishment and the likelihood of being used as a relay. With SP protection, the adversary cannot create clones and is limited to using only the keys originally stored on the captured node.

2) Node Capture Attacks: Node capture attacks use long-term keys in the node to observe pairwise links between other nodes in the network. With SP, an adversary can no longer extract the keys. However, the adversary can still change unprotected software which calls the TSM. A simple TSM might provide functions like Encrypt (key, data) and Decrypt (key, data). The adversary can use the keys through this TSM interface to observe or attack pairwise links without ever seeing the actual keys. While we do not prevent node capture attacks outright, such attacks are limited since the adversary can only observe links within the communication range of the compromised node. This severely limits the SAP, which is constrained by the number of captured nodes.

Attacks on Changing the TSM or the Device Key

The security of the long-term keys relies on the correctness and proper design of the authority's TSM. As part of the trusted computing base of the system, this software must not leak secrets it has access to. This includes any intermediate data written to general purpose memory, off-chip storage, or left in general registers when it exits. The TSM runs with interrupts disabled, so no other software will have an opportunity to observe its registers or modify its code or data while it is executing. If the TSM ever exits abnormally due to an exception, the processor clears the general registers before ending protected mode. Any other sensitive data will be in the TSM scratchpad memory which other software cannot access.

In order to circumvent the access control provided by the authority's TSM, the attacker might try to replace it with its own TSM or modify the existing TSM. In Reduced Sensor-mode (FIG. 9), the TSM and long-term keys are stored in on-chip non-volatile memory (e.g., EEPROM) where they cannot be modified without clearing the device key. In Expanded Sensor-mode (FIG. 11), the attacker could modify or replace the TSM code in off-chip storage. The hash checking routine will detect any such modifications made to the TSM before execution. We assume that the data in off-chip storage cannot be modified through a physical attack during execution. If this is not the case, the TSM and keys should first be copied to general purpose memory on-chip before being verified, where they will be safe from physical attacks.

Finally, if the attacker tries to modify the ASH register to match the new TSM code, the device key will be cleared, irrevocably cutting off the attacker's access to all of the keys that were encrypted with that device key. Clearing or setting the device key also clears the TSM scratchpad memory, so any intermediate data stored there that might have leaked secrets is also unavailable to the new TSM.

Simulation Results.

The simulation was run for a 10×10 grid network, and all nodes are assumed to have the same (1 unit) transmission range. A total of 400 nodes were randomly placed in the network. Probabilistic key establishment is used. Network-wide SAP is calculated as the fraction of links that can be intercepted by the compromised nodes among all the pairwise links established among the authorized nodes. All simulation results are averaged over 10 sets of random seeds that affect the distributions of the location of each node, the key rings preloaded to nodes, and the relay choices.

If every node is equipped with the Sensor-mode SP architecture (either Reduced Sensor mode SP in FIG. 9 or Enhanced Sensor mode SP in FIG. 11), the adversary can only launch a node capture attack, where the adversary utilizes the captured nodes themselves to intercept pairwise-key establishment. Without the SP architecture, the adversary can further launch node fabrication attacks where it can turn the captured nodes into super-nodes by loading each of them with all of the keys from all captured nodes. Each super-node can mimic multiple nodes. A straightforward method to achieve this is to let each super-node stay at its original location but announce the existence of all the captured nodes. The adversary can even make more copies of the super-nodes and deploy them into the network to eavesdrop additional communication. Detecting the duplication of nodes within the network is difficult, requiring knowledge of the location of each node—possibly using GPS (Global Positioning System)—and non-trivial communication and memory overhead.

Figure 12:
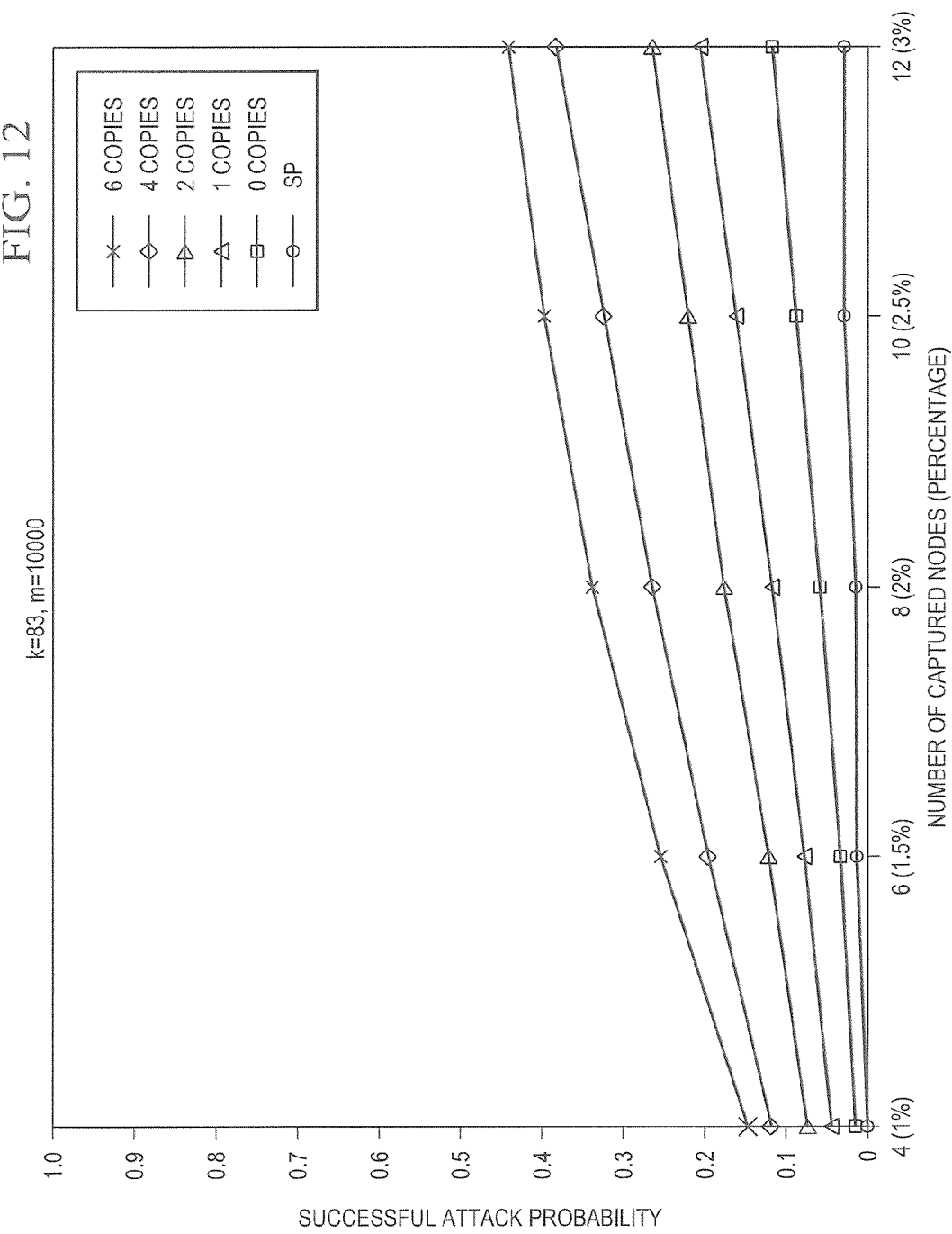
FIG. 12 shows a network-wide successful attack probability graph.

FIG. 12 shows the network-wide SAP under different numbers of captured nodes, for different kinds of attacks. "SP" means launching only node capture attacks with the SP architecture. "0 copies" means changing captured nodes into super-nodes (i.e., node fabrication attack) due to the lack of the SP architecture. "x copies" means making x extra copies of these super-nodes. Note that, without SP, the effect of node capture can be serious. When only 3% of the nodes are captured, the SAP for the network will be 9.7% even with 0 copies, and becomes 42.6% if the adversary makes 6 copies of the captured nodes to cover more area. Whereas the SAP for the nodes with SP is only 2.1% a reduction by roughly an order of maygnitude. Therefore, SP provides significant benefits in terms of alleviating node fabrication attacks.

FIG. 13 shows the network-wide SAP under different sizes of the preloaded key ring, k (i.e., k long-term keys), for different attack models, assuming 2% of nodes have been captured. An increasing value of k has two effects on the network. First, the link connectivity increases; this reduces the probability of two neighboring nodes establishing a pairwise link through a relay node, and thus can improve the network security. Second, each node captured by the adversary contains more keys, which will increase the chance of intercepting the communications on other pairwise links. This is detrimental to the network security. As shown, the advantage of the first effect dominates and the overall SAP decreases with an increasing value of k. Notice that the SP architecture offers significant advantages over the other schemes for all values of k.

Finally, the single common key scheme also benefits from SP since the adversary, without the ability to learn the common key, can only eavesdrop on the information exchanged within the communication range of the captured nodes.

Cost Concerns

When considering low-cost sensors, any new hardware must be designed for high volume in order to keep down fabrication costs. Accordingly, Sensor-mode SP provides basic security primitives and a hardware root of trust using a design that is easily integrated into the SoC of standard embedded processors. It therefore supports a wide range of software protection mechanisms with only a slight increase in chip area, and thus only a relatively small, if any, additional cost for the chip. The overhead for loading the software and the keys onto the sensor is also relatively low and straightforward, the largest cost would be the design of the TSM, which is a one-time cost and well within the scope of one skilled in the art to achieve.

While only two embodiments are discussed herein for sensor protection, one skilled in the art could devise several other embodiments using the concepts disclosed herein. The embodiments discussed illustrate two low-cost hardware-based architectures to enhance the security of key management schemes against the attack of sensor node fabrication for a lightweight mobile ad hoc network. Unlike many software-only schemes that make tradeoffs between SAP and link connectivity, Sensor-mode SP directly prevents exposure of keys during node capture. The simulation results show that these proposed architectures can decrease the Successful Attack Probability on pairwise links by an order of magnitude. Note that the same hardware mechanisms can be used for pairwise key establishment for any ad-hoc network, not only for sensor networks.

For the purposes of this invention, we define a "processor" or a "micro-processor" as some hardware circuitry capable of executing software code. A processor can be one of: a processor chip, a micro processor, a SOC (System-on-Chip) chip, an embedded processor, a crypto processor, an ASIP (Application Specific Instruction Processor), a multicore chip (a single chip with multiple processor cores on it), an MPSOC (Multiple homogeneous or heterogeneous processors on an SOC which can also contain many other IP cores—including also memory, storage, I/O, networking, and multimedia, e.g., JPEG or MPEG, encoders/decoders), a hardware component containing at least one processing element that is connected to the cryptographic key register, DRK, (and cryptographic hash register, SRH) via a link that is physically secure from probing, or any similar hardware component.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computing device having a hardware portion and at least one memory external to said hardware portion, said computing device comprising:
at least one hash register for storing a root hash of a hash tree corresponding to a secure storage area within the at least one memory external to said hardware portion, said root hash encoding information about the integrity of said secure storage area, said register constructed within said hardware portion; and
at least one symmetric cryptographic key register physically constructed within said hardware portion at a location such that probing of said register by a user is difficult to achieve without rendering data in said register useless for its intended purpose, wherein said hardware portion includes at least one processing element with hardware circuitry capable of executing software code, and the processing element is connected to said hash register and said cryptographic key register, and wherein said computing device includes a trusted software module (TSM), said TSM having exclusive access to data or programs in said secure storage area, said TSM using said at least one hash register to verify the integrity of data fetched from said secure storage area, and said TSM using key data based on said symmetric cryptographic key register to decrypt data fetched from said secure storage area.

2. The computing device of claim 1 further comprising: means for allowing data to be changed within said registers only by particular software or only when the computing device is put into a particular state or processing mode.

3. The computing device of claim 1 further comprising: means for allowing contents from said cryptographic key register to be used only by other hardware components and not by any software components, and means for at least one of those hardware components to cryptographically transform said contents before making the result accessible to software.

4. The computing device of claim 1 wherein said TSM is operative for controlling data stored on said computing device, said stored data being stored under said TSM control being encrypted using encryption key data stored in said cryptographic key register or derived from said cryptographic key register and said stored data is hashed by said TSM by updating intermediate values of the hash tree and the root hash value in said hash register.

5. The computing device of claim 4 further comprising: a dynamic code integrity checking circuit for dynamically checking code of said TSM using said registers.

6. The computing device of claim 4 further comprising: means for encrypting and/or hashing secure data in the hardware belonging to said TSM before said data leaves said hardware portion, said encrypting based on information in at least one of said registers.

7. The computing device of claim 4 further comprising: means for encrypting of general registers during interrupts, system calls or context switches, said encryption based on information in at least one of said registers; and means for decrypting said last-mention encrypted registers after returning from said interrupts, system calls or context switches, said decryption based on information in at least one of said registers.

8. The computing device of claim 4 further comprising: at least one region of memory that is only accessible to the TSM.

9. The computing device of claim 8 further comprising: means to access said TSM-only memory regions using special instructions that access only said regions of memory.

10. The computing device of claim 9 further comprising: means to access said TSM-only memory regions by specifying an address range to the hardware.

11. The computing device of claim 1 wherein said registers are non-volatile.

12. The computing device of claim 1, wherein the computing device signs Trusted Software Module (TSM) code by computing hash values over cache lines of code and embeds the computed hash values into each cache line of code.

13. The device of claim 1, wherein the secure storage area stores cryptographic keys and polices for usage of the keys to allow the TSM to control access to encrypted files, and wherein decryption of said encrypted files and access to decrypted versions of the files is granted only if the policies allow the user to access the files.

14. The device of claim 13, wherein the keys and policies are bound together by an integrity mechanism of the secure storage area using the hash register, and cannot be separated.

15. A system of computers each having at least one hardware processor and at least one memory external to said processors each said computer comprising:

at least one cryptographic key register and at least one cryptographic hash value register, said at least one hash value register storing a root hash of a hash tree corresponding to a secure storage area in said at least one memory, said root hash encoding information about the integrity of said secure storage area, each register physically constructed within said hardware processor at a location such that probing of said registers by a user is difficult to achieve without rendering data in said register useless for its intended purpose; each said computers having loaded thereon at least one trusted software module (TSM); and a unique symmetric device root encryption key loaded in said cryptographic key register, each set of said registers operatively responding only to a TSM loaded on the same computer.

16. The system of claim 15 further comprising: loading secure data into at least some of said computers, said secure data being controlled by access rules and said secure data encrypted and hashed under control of said TSM operating with at least indirect or limited access to data in said registers.

17. The system of claim 16 wherein said secure data is loaded to a computer from an authority common to the computers.

18. The system of claim 17 further comprising: means for testing a transmission between said authority and said computer to ensure that said cryptographic key has not been compromised.

19. The system of claim 18 further comprising: means for ensuring that if said cryptographic key has not been compromised, then all data encrypted by said cryptographic key has not been compromised, and that said hash register can only be changed by said TSM.

20. The system of claim 17 wherein said secure data is bound to a usage key which usage key is also bound to a set of zero or more rules, which rules can be different for each set of secure data, and wherein each usage key is bound to a particular system computer.

21. The system of claim 16 wherein said rules provide for revocation of access rights for secure data stored on one or more of said computers.

22. The system of claim 21 wherein said revocation is enforced by said TSM on said specific computer.

23. The system of claim 16 wherein said secure data can be loaded to or added to a specific computer from a third party other than the authority common to said computers upon passage of a certification of authenticity from said specific system computer to said third party, said certificate of authenticity only being allowed under control of said TSM on said specific computer and only in accordance with rules placed on said specific computer by said authority, said rules being part of said secure data loaded from said authority.

24. The system of claim 15 further comprising: means for dynamic code integrity checking of said TSM using said registers.

25. The system of claim 15 wherein said registers are non-volatile.

26. The system of claim 15, wherein the system signs TSM code by computing hash values over cache lines of code and embeds the computed hash values into each cache line of code.

27. A method for storing data on a computer, said method comprising:
- storing a symmetric device root key (DRK) by a trusted authority for storage in a first register contained within a processor of said computer;
- storing a storage root hash (SRH) in a second register contained within a processor of said computer, said storage root hash corresponding to a root hash of a hash tree corresponding to a secure storage area within at least one memory external to said hardware portion, said root hash encoding information about the integrity of said secure storage area;
- storing a trusted software module (TSM) by said authority on said computer, said TSM being the only software on said computer that can interact with said SRH; and
- encrypting any secure data to be stored on said computer under control of said TSM working in conjunction with said DRK.

28. The method of claim 27 wherein said storing further comprises: associating rules for usage of stored secure data, said rules bound to a derivative key using same said DRK to generate such derivative key.

29. The method of claim 27 wherein said DRK and said hash registers are non-volatile.

30. The method of claim 27 further comprising: allowing DRK to be changed only at initialization of said computer.

31. The method of claim 30 wherein said initialization comprises: bypassing the normal boot process to allow for the setting of said DRK.

32. The method of claim 31 further comprising: setting a flag within said processor prior to running the normal boot process, said flag preventing further modifications to said DRK.

33. The method of claim 31 further comprising: controlling data stored on said computer by said TSM, said stored data being stored under said TSM control being encrypted using said DRK or a derivative thereof in conjunction with said DRK such that said TSM does not gain access to said DRK.

34. The method of claim 27 further comprising: dynamically checking code of said TSM to ensure said code has not been compromised while said TSM is performing its operation on data.

35. The method of claim 27 further comprising: encrypting and/or hashing secure data in the hardware belonging to said TSM before said data leaves said processor, said encrypting based on information in at least one of said registers.

36. The method claim 27 further comprising: encrypting of general registers during interrupts: system calls or context switches, said encryption based on information in at least one of said registers; and decrypting said last-mention encrypted registers after returning from said interrupts, system calls or context switches, said decryption based on information in at least one of said registers.

37. The method of claim 27 wherein secure data is bound to a usage key which usage key is bound to at least one or a set of rules, which rules can be different for each set of secure data, and wherein each usage key is bound to said processor via said DRK and is protected from modification by said cryptographic hash register.

38. The method of claim 27 further comprising: at least one region of memory that is only accessible to the TSM.

39. The method of claim 38 further comprising: accessing said TSM-only memory regions using special instructions that access only said regions of memory.

40. The method of claim 27, further comprising signing TSM code by computing hash values over cache lines of code and embedding the computed hash values into each cache line of code.

* * * * *